United States Patent [19]
Finkelstein et al.

[11] Patent Number: 6,025,841
[45] Date of Patent: *Feb. 15, 2000

[54] METHOD FOR MANAGING SIMULTANEOUS DISPLAY OF MULTIPLE WINDOWS IN A GRAPHICAL USER INTERFACE

[75] Inventors: Erich Soren Finkelstein, Redmond, Wash.; Samuel David Hobson, Palo Alto, Calif.; Adrian Klein; Benjamin Waldman, both of Seattle, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,771
[22] Filed: Jul. 15, 1997
[51] Int. Cl.[7] ........................................................ G06F 3/14
[52] U.S. Cl. ......................... 345/342; 345/344; 345/346; 345/356
[58] Field of Search .................................... 345/340, 344, 345/345, 342, 346, 336, 338, 356

[56] References Cited

U.S. PATENT DOCUMENTS

| | | | |
|---|---|---|---|
| 4,783,648 | 11/1988 | Homma et al. ........................ | 345/340 |
| 5,469,540 | 11/1995 | Powers, III et al. .................... | 345/336 |
| 5,487,143 | 1/1996 | Southgate ............................... | 345/342 |
| 5,621,904 | 4/1997 | Elliott et al. ............................ | 345/342 |

*Primary Examiner*—Raymond J. Bayerl
*Assistant Examiner*—Cuong T Thai
*Attorney, Agent, or Firm*—Jones & Askew, LLP

[57] ABSTRACT

A method for managing simultaneous display of multiple windows in a graphical user interface (GUI). A computer system with a display and user interface input device displays a primary or container window on the display, comprising a predetermined region for displaying information and/or receiving user commands associated with a first computer process. The system displays a target window comprising a predetermined region for displaying information and/or receiving user commands associated with a different computer process. The target window is typically displayed in a higher z-order relative to the primary window to maintain it on top. In response to a predetermined triggering condition, the target window is manipulated by movement, temporary disappearance, and/or size reduction, while maintaining the relative z-order of the target window relative to the primary window and away from a predetermined avoidance region associated with the first computer process. The target window can be moved away a minimal distance, biased in a predetermined direction, or positioned at anchor points relative to the container window to avoid obscuring the avoidance region.

36 Claims, 21 Drawing Sheets

MoveAway - Selection

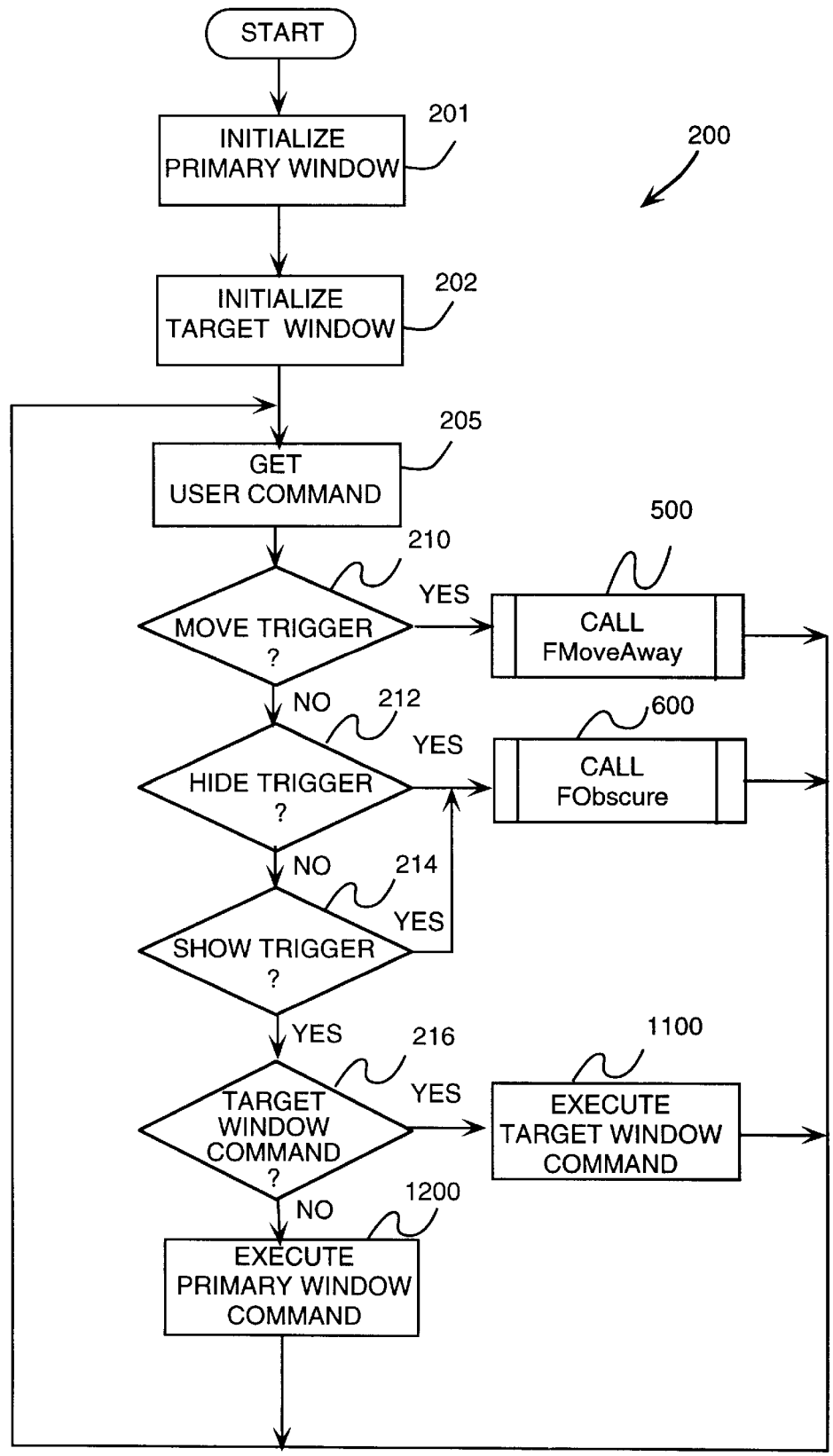
FIG. 2 MAIN FLOW DIAGRAM

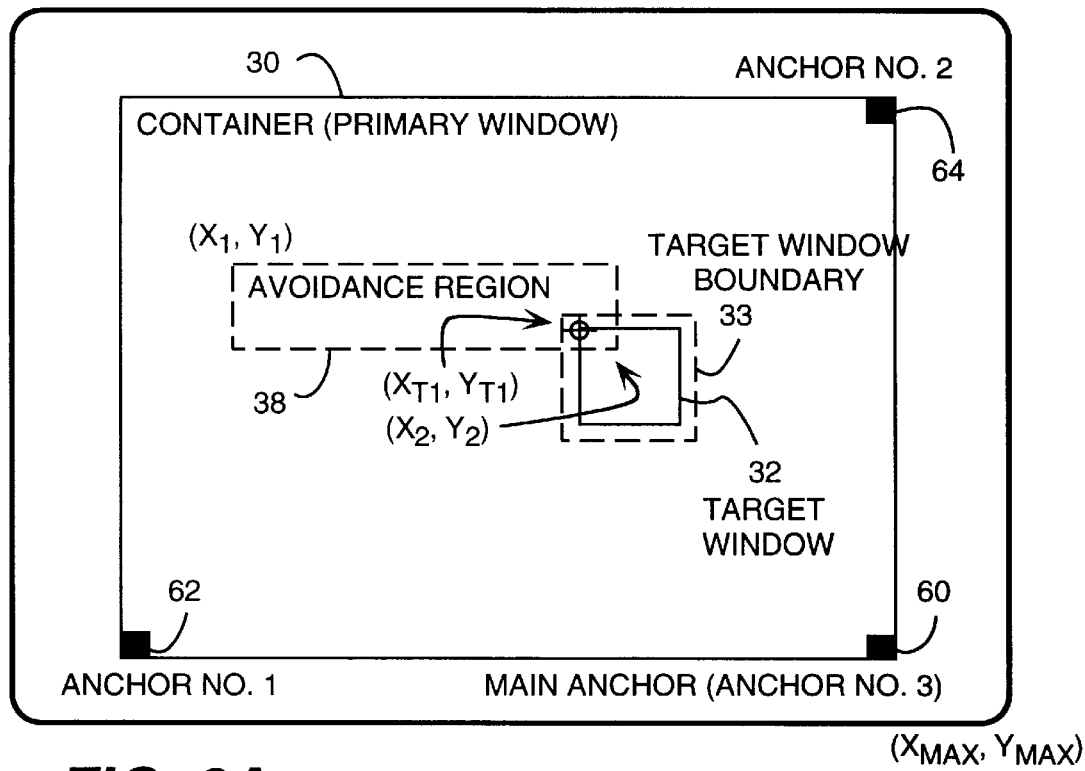
FIG. 3A  MINIMAL BIASED MOVE - BEFORE
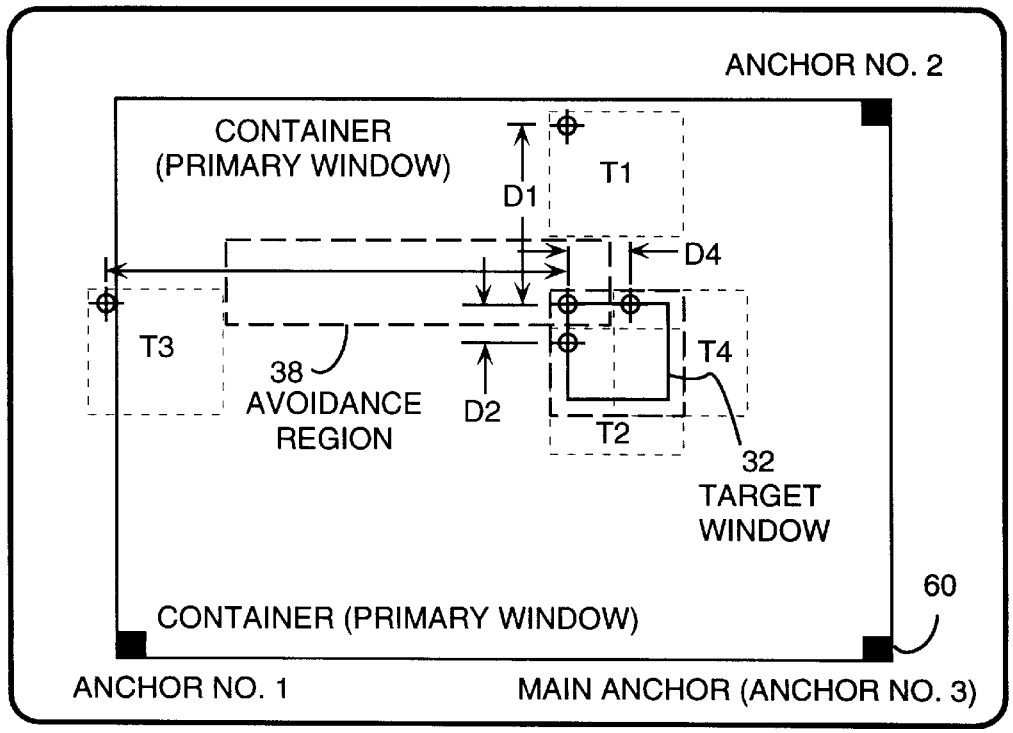
FIG. 3B  MINIMAL BIASED MOVE - COMPUTE MOVE
D2 < D4 < 1.5D1 < 1.5D3 --> Choose D2

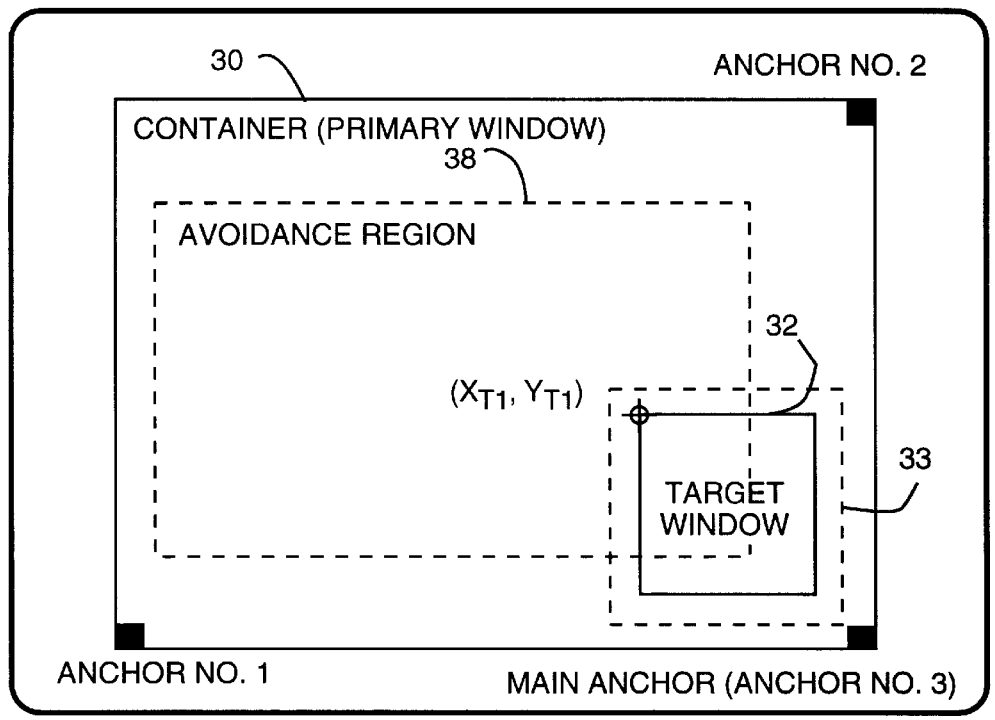
FIG. 4A  MINIMAL BIASED MOVE - MINIMIZE OVERLAP - BEFORE
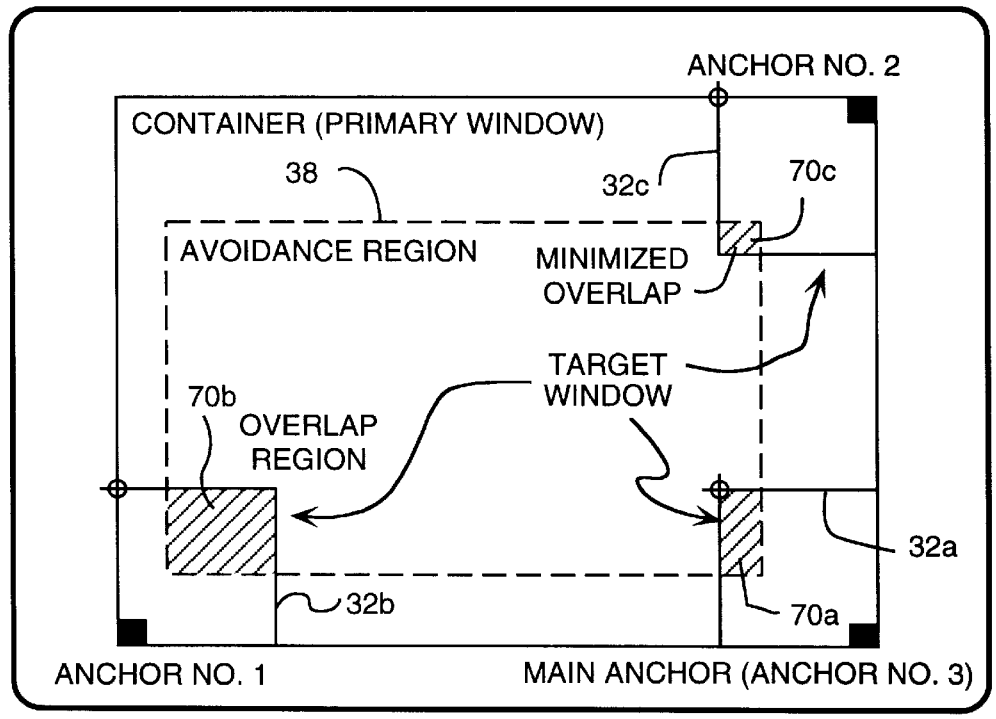
FIG. 4B  MINIMAL BIASED MOVE - MINIMIZE OVERLAP - AFTER

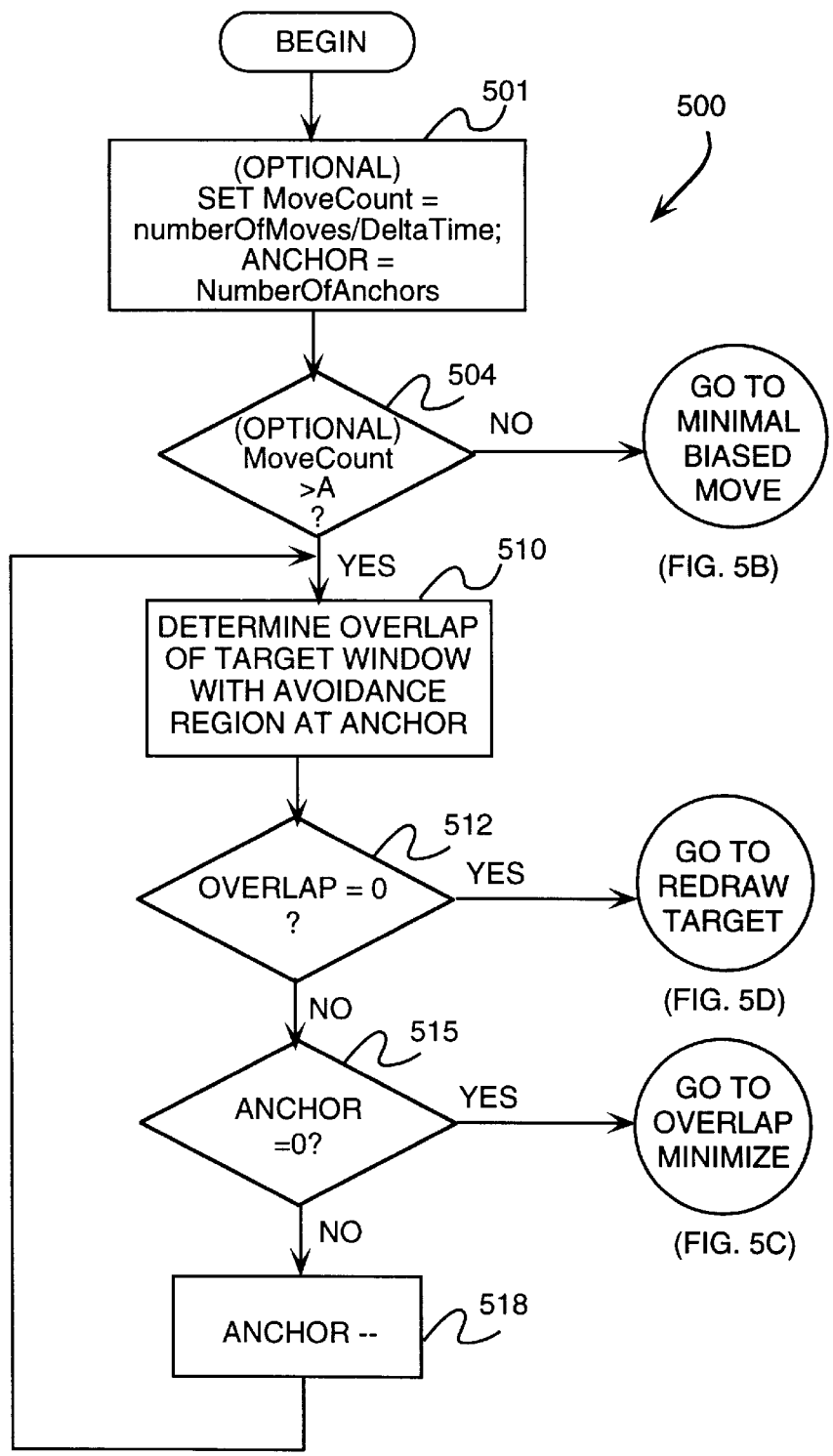
FIG. 5A   FMoveAway (RECT *prcAvoid, RECT *prcContainer)

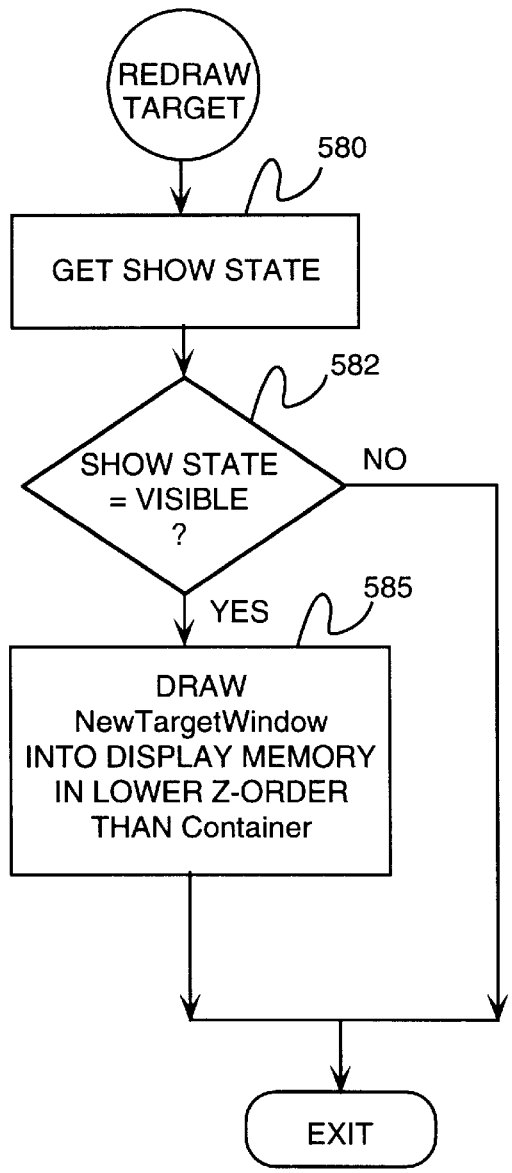
FIG. 5D  REDRAW TARGET

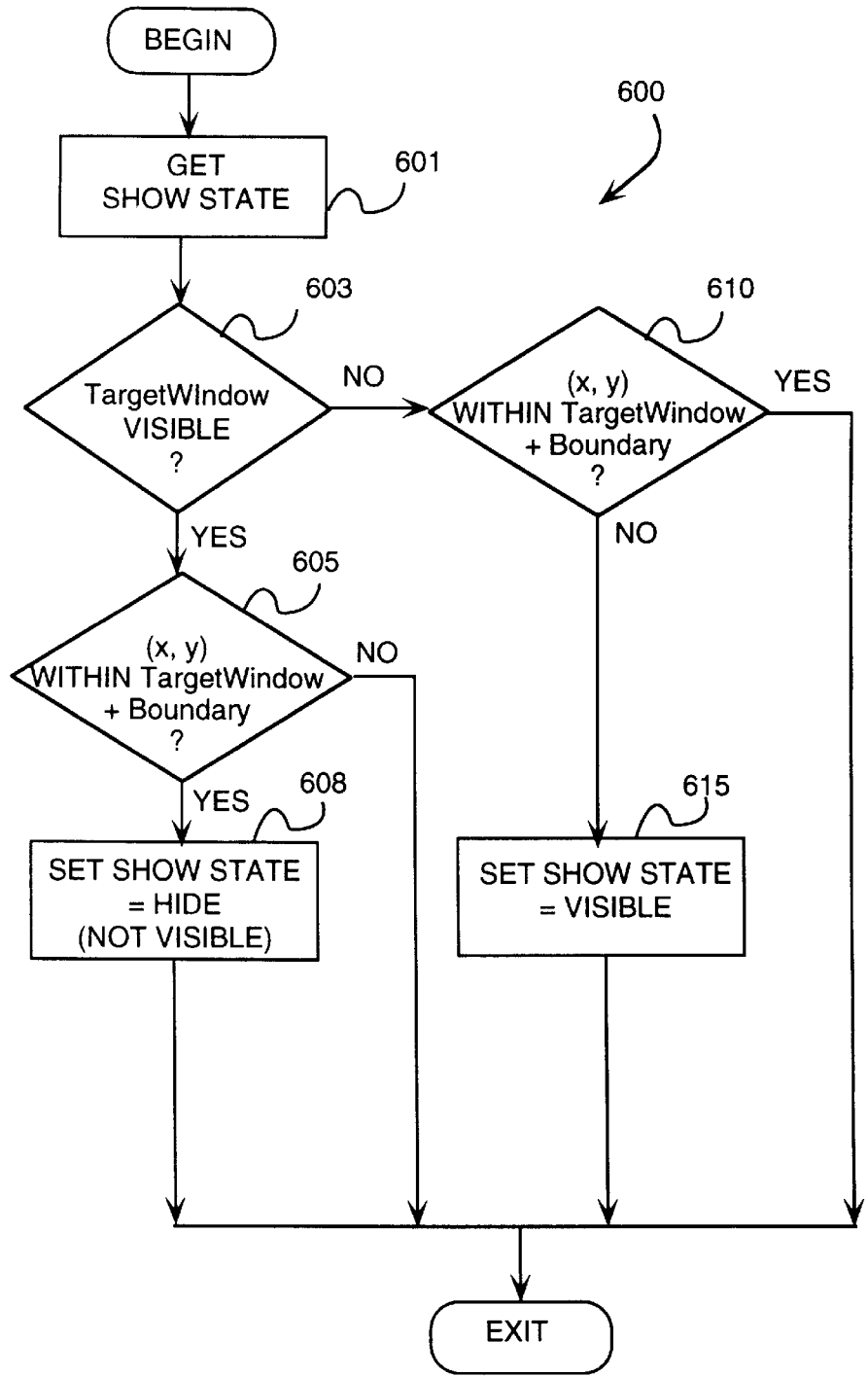
FIG. 6  TARGET WINDOW OBSCURE (DISAPPEAR)

MoveAway - Selection

MoveAway - Manual Relocation of IP

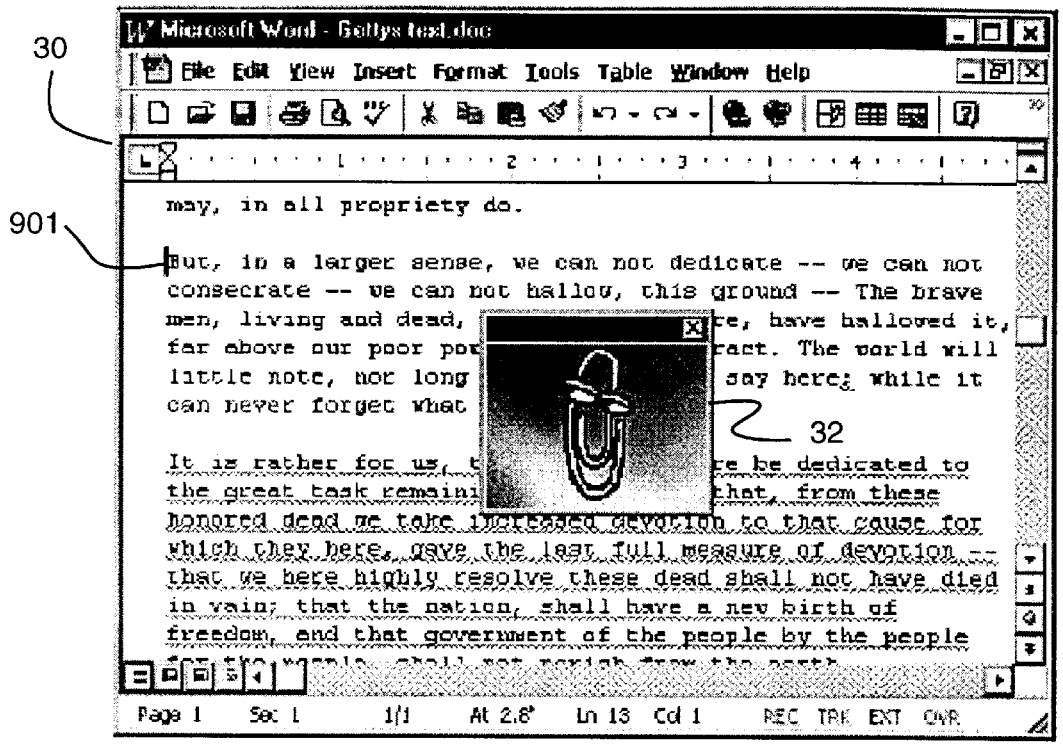
FIG. 9A
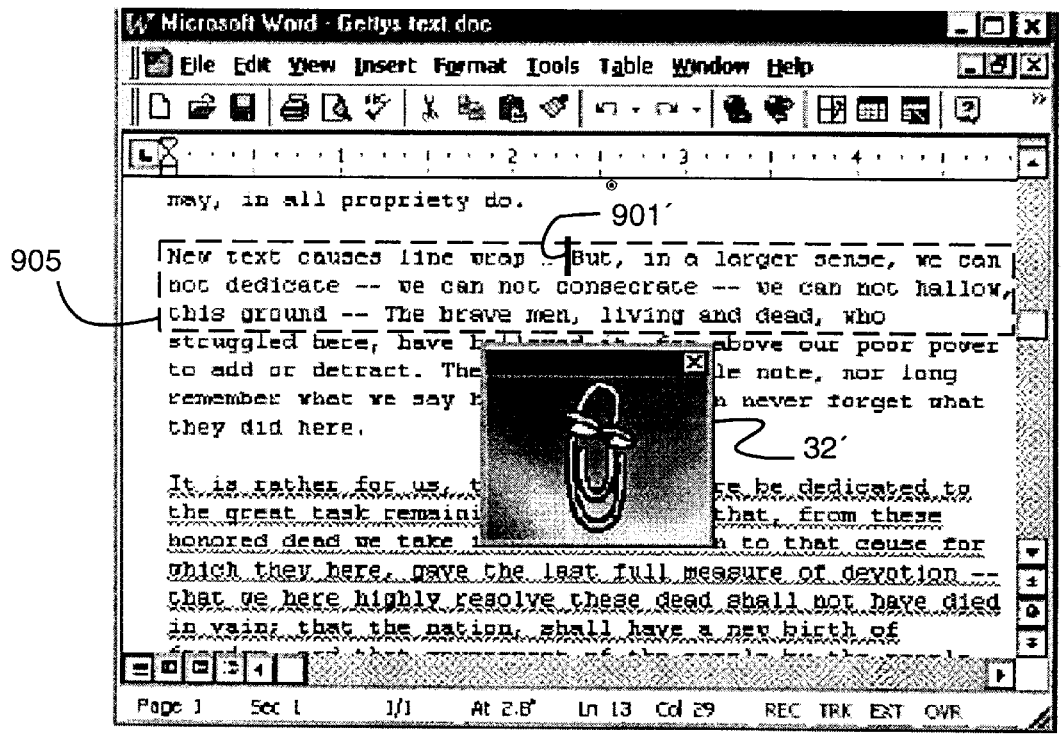
FIG. 9B     MoveAway - Line Wrap

MoveAway - Insert Page Number

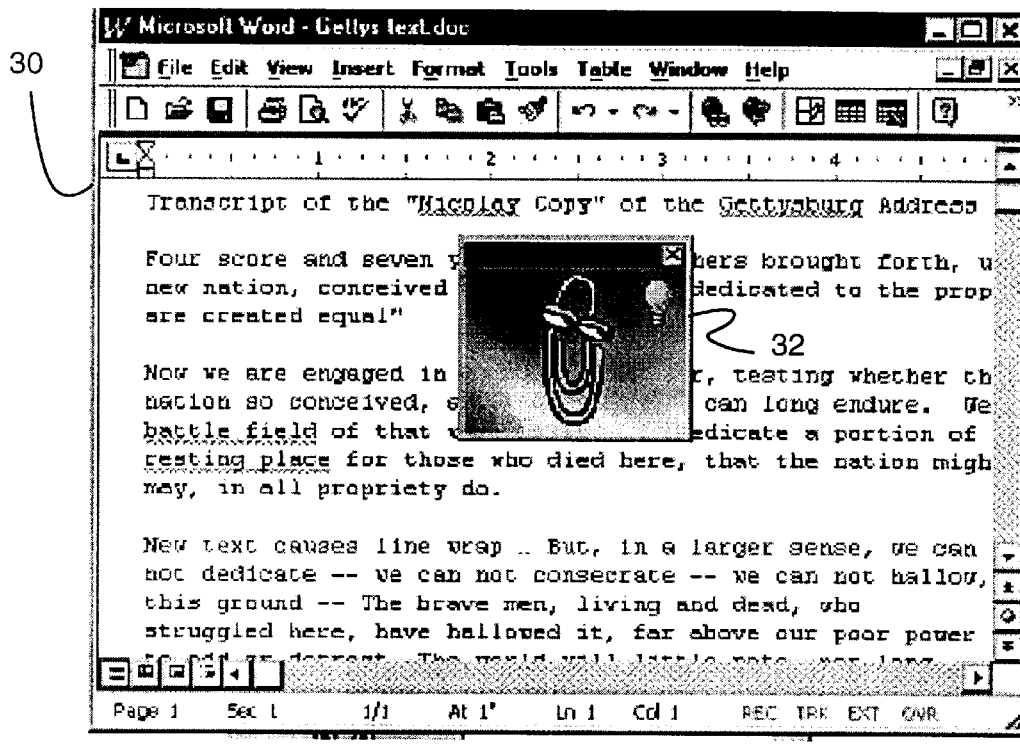
FIG. 11A
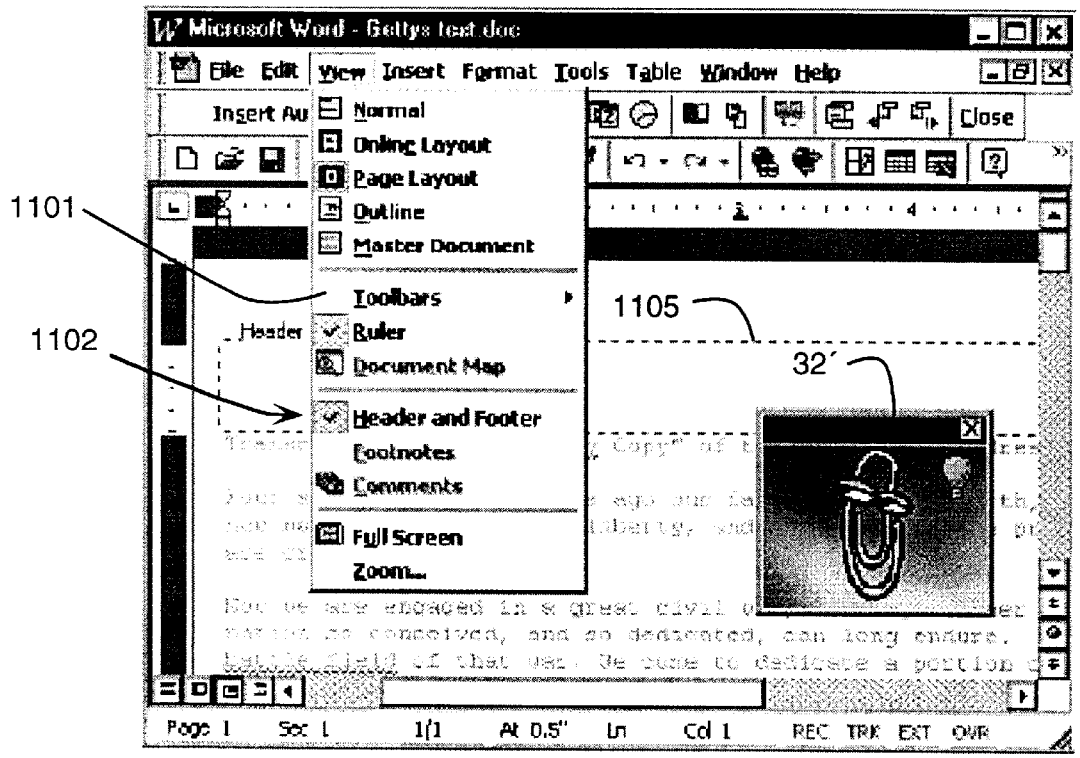
FIG. 11B  MoveAway - View Header and Footer

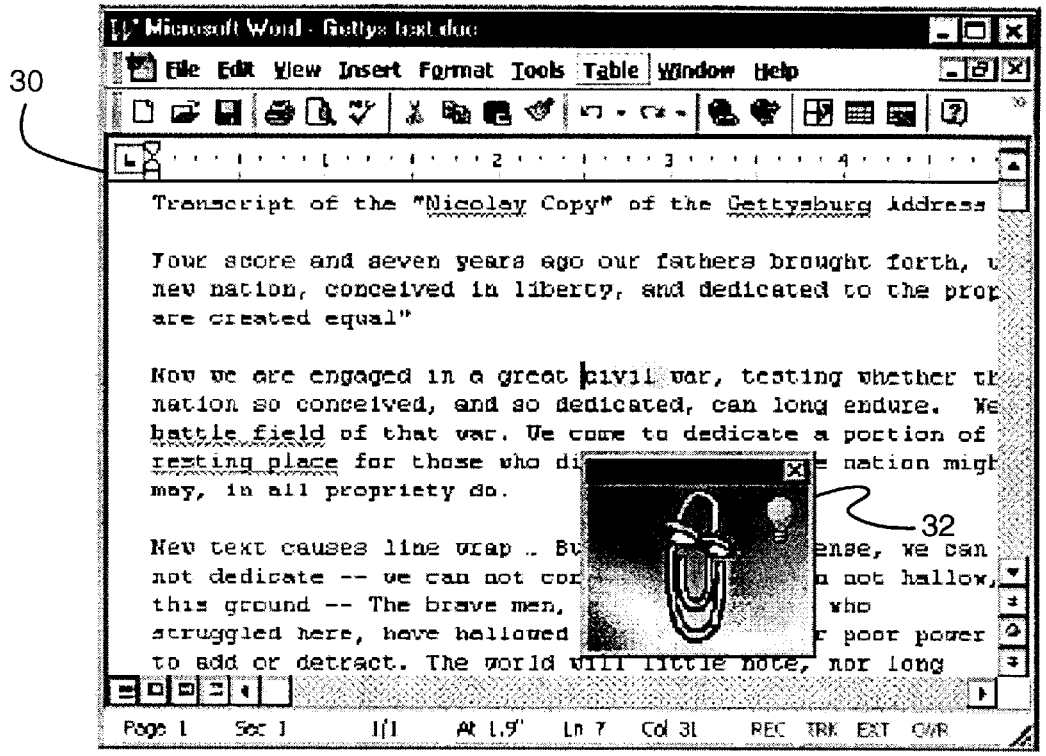
FIG. 12A
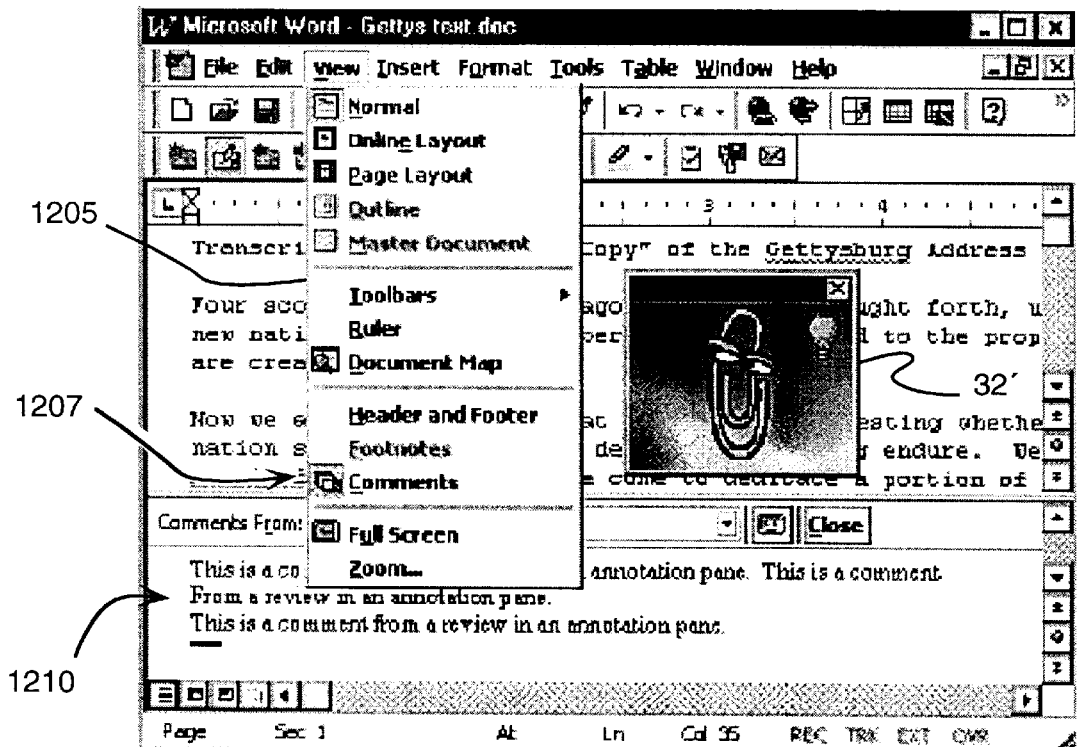
FIG. 12B MoveAway - Insert/View Annotation

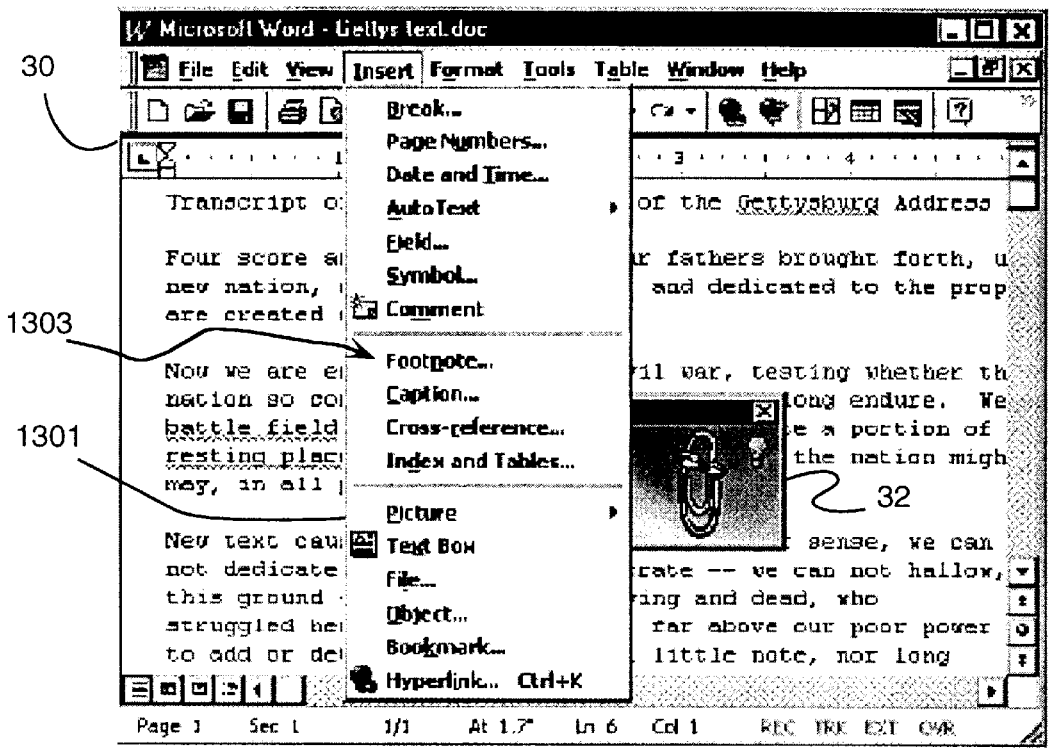
FIG. 13A
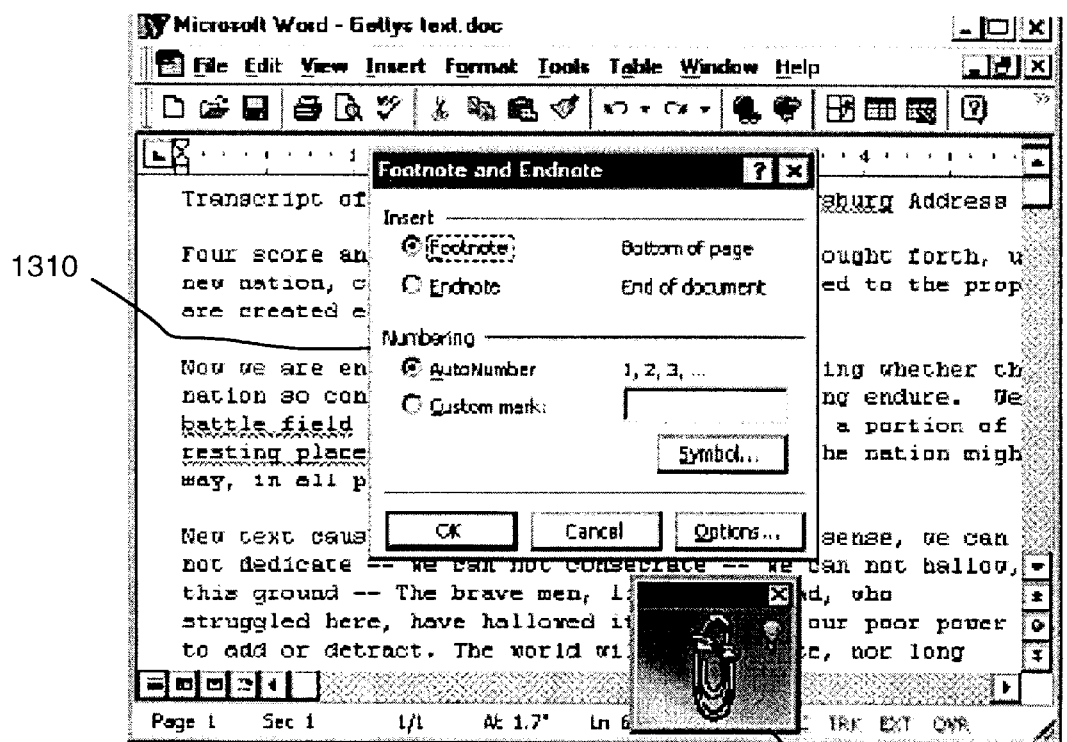
FIG. 13B  MoveAway - Insert/View Footnote

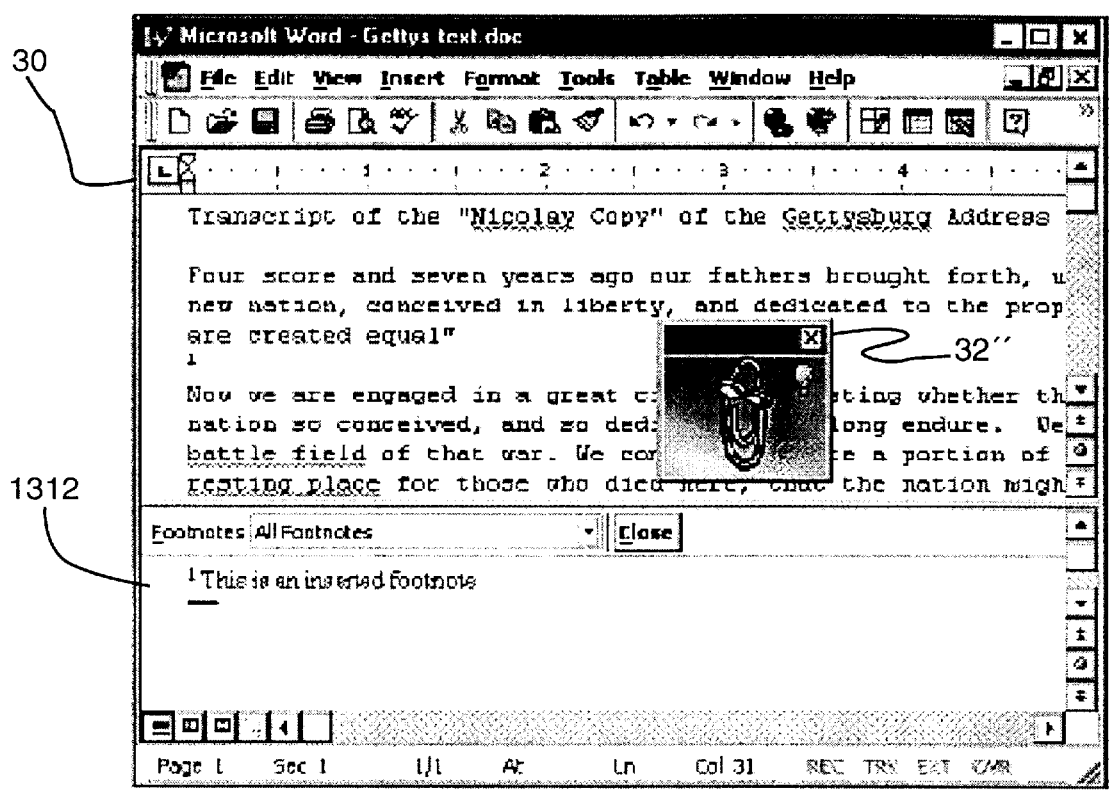
FIG. 13C   MoveAway - Insert/View Footnote (cont)

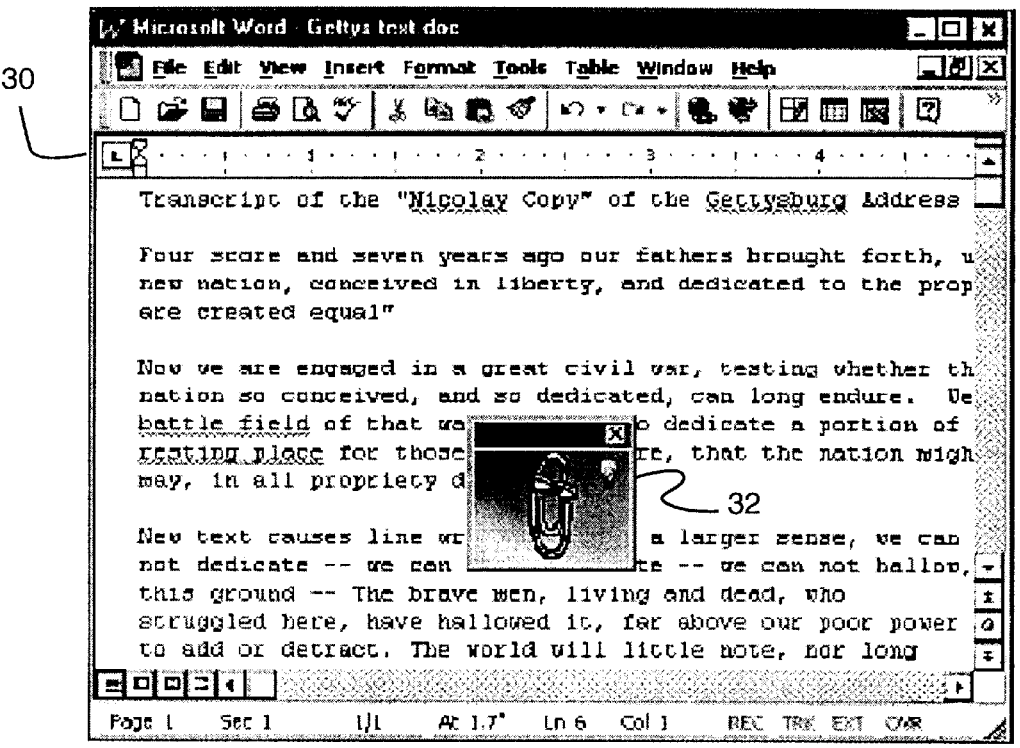
FIG. 14A
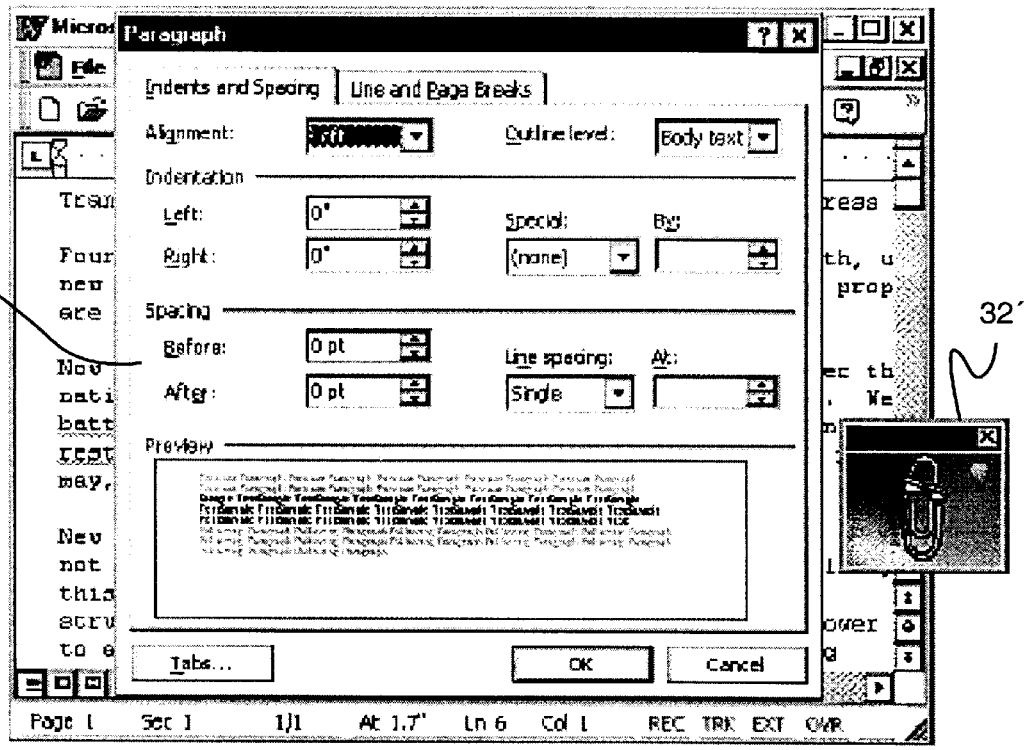
FIG. 14B  MoveAway - Dialog Display

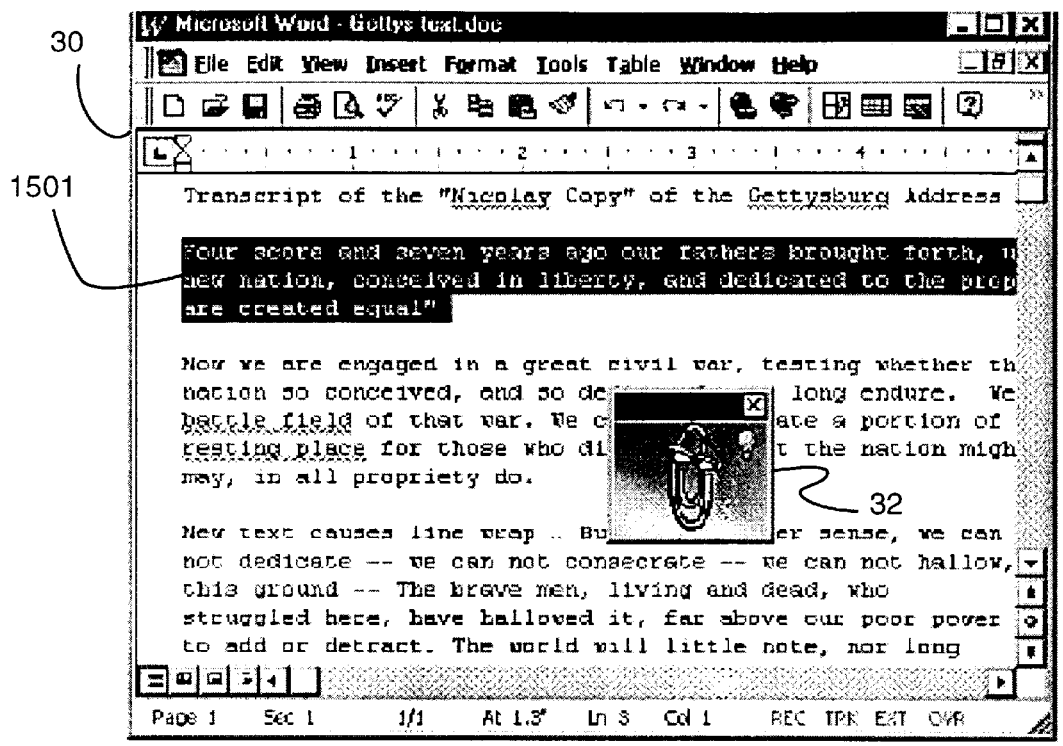
FIG. 15A
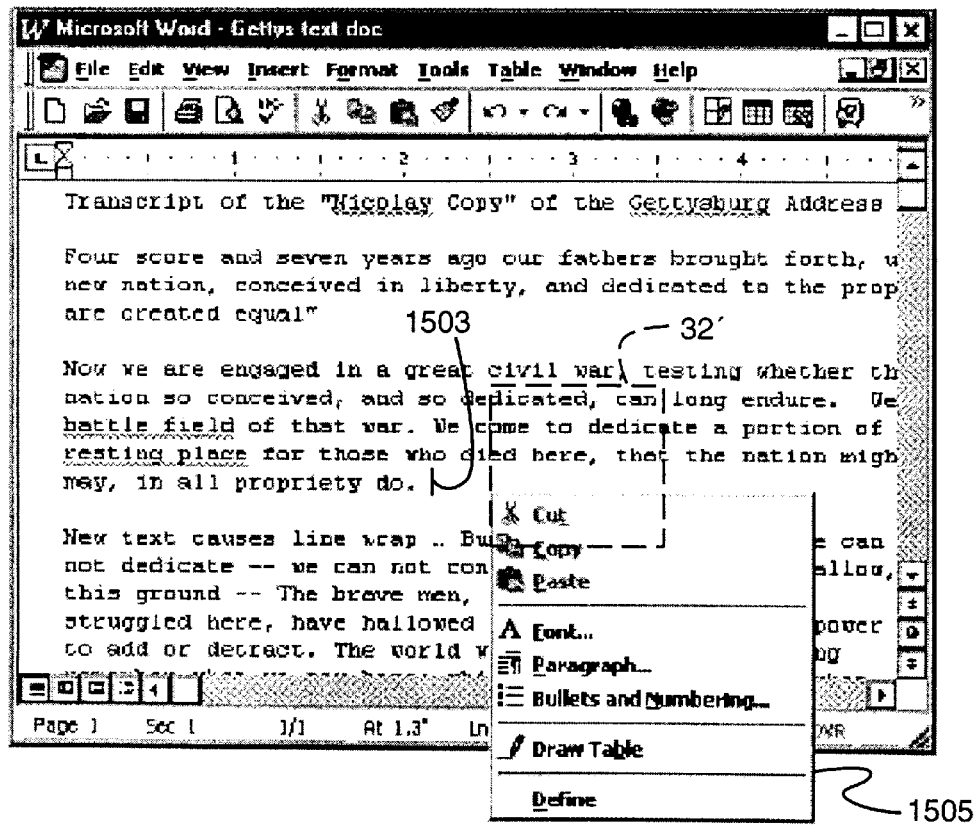
FIG. 15B  Obscure - Drag Operation

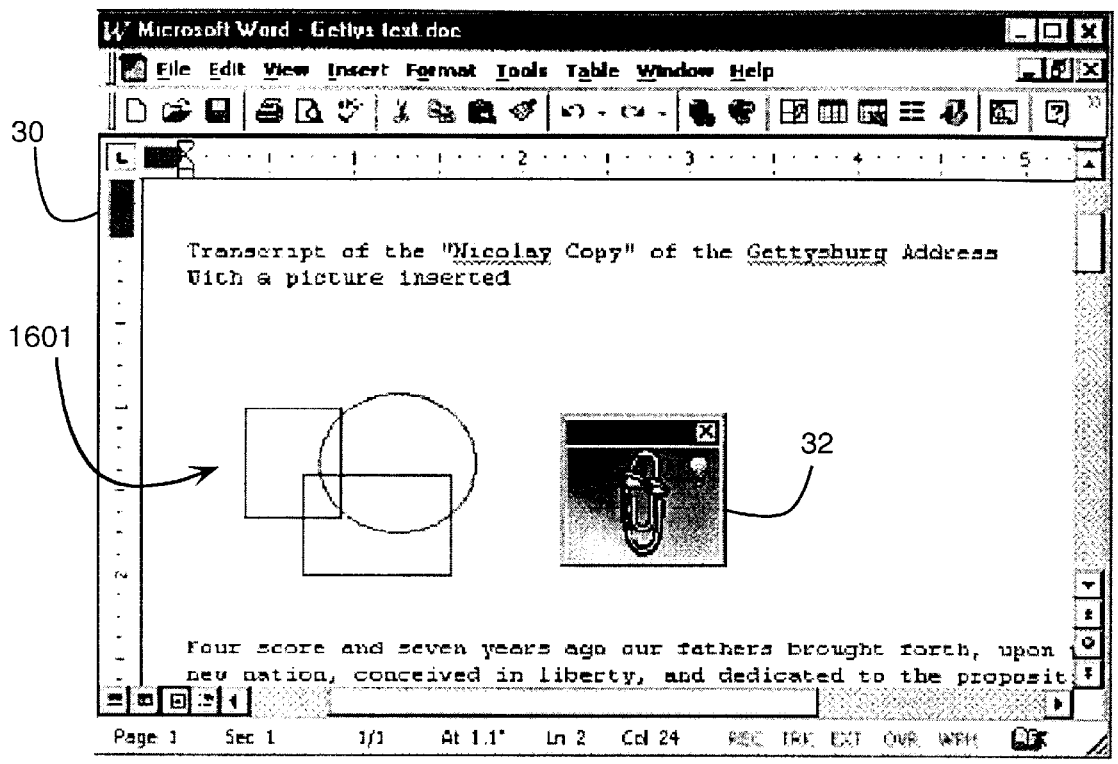
FIG. 16A
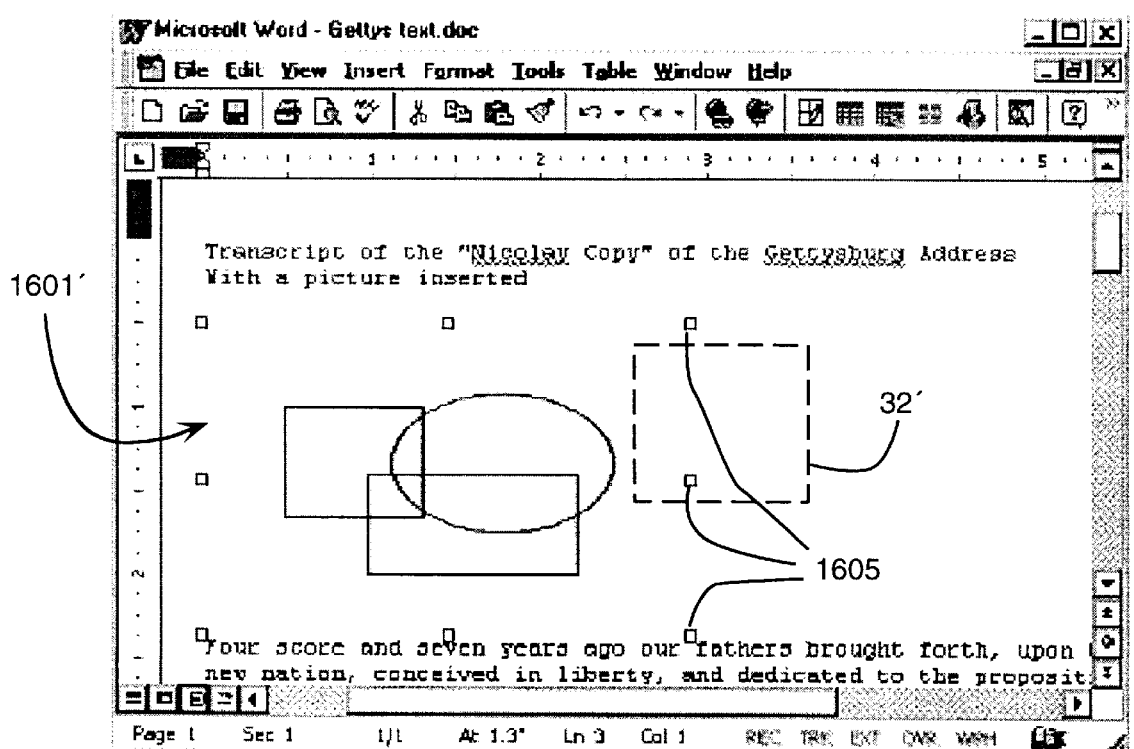
FIG. 16B Disappear - Resize Operation

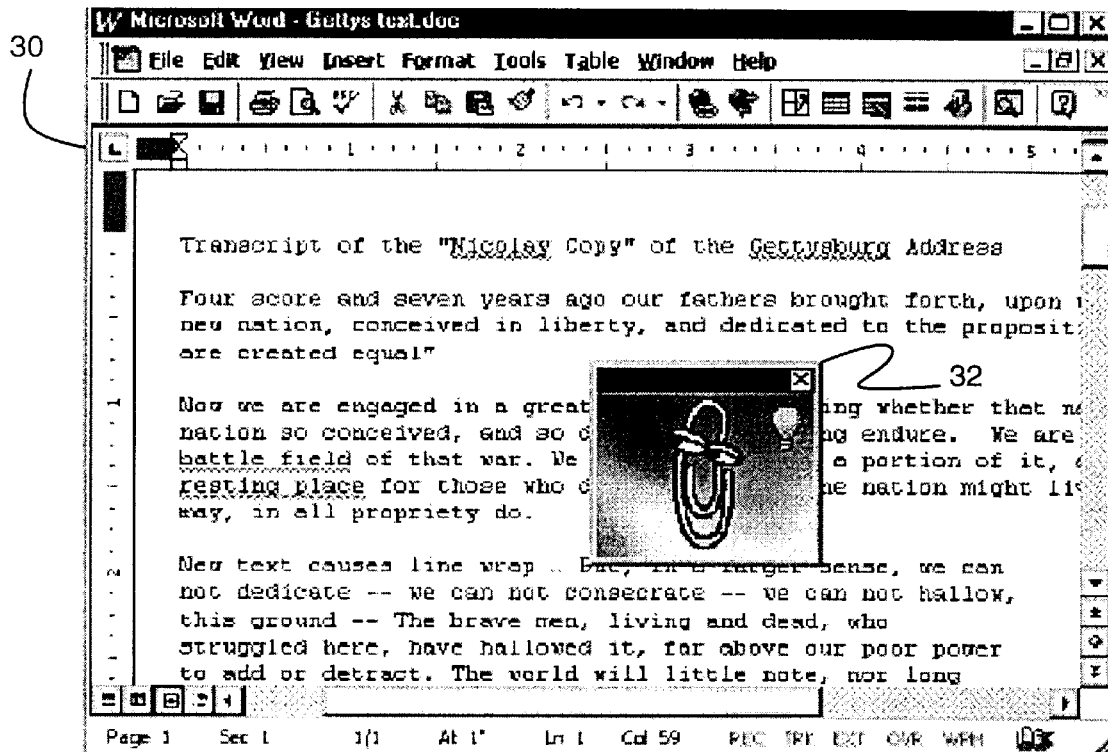
FIG. 17A
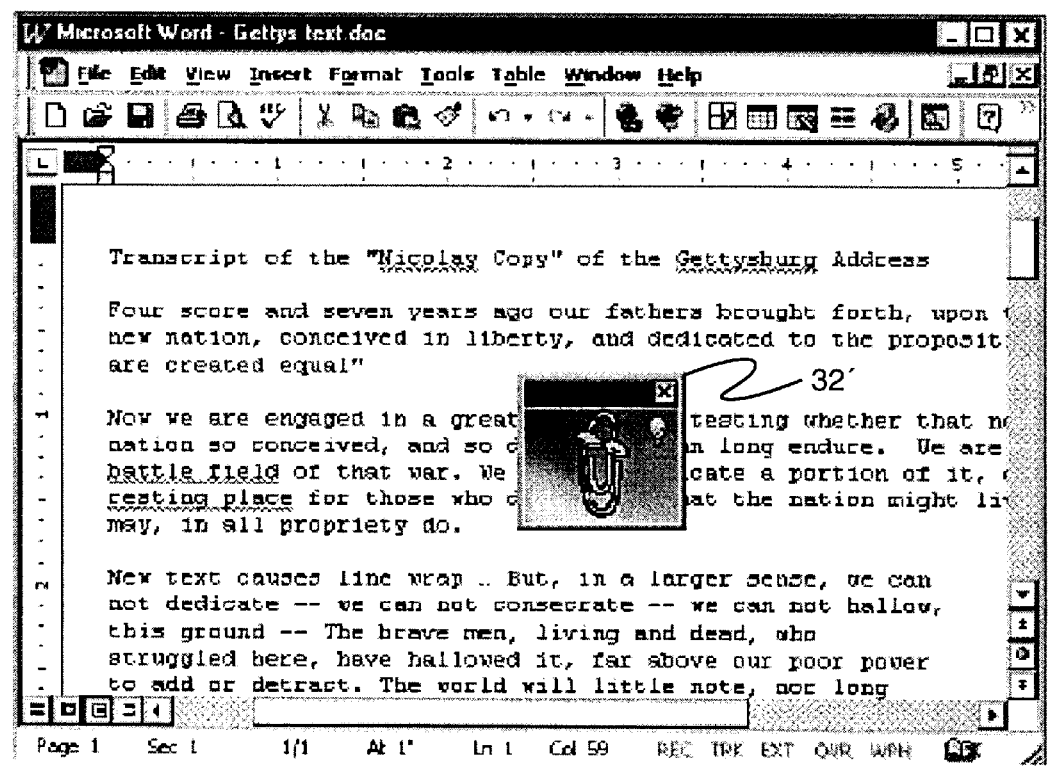
FIG. 17B Reduce

METHOD FOR MANAGING SIMULTANEOUS DISPLAY OF MULTIPLE WINDOWS IN A GRAPHICAL USER INTERFACE

TECHNICAL FIELD

The present invention relates generally to the field of computer systems, and more specifically relates to methods and systems for providing continuous, automatic adjustment to window size and position based on analysis of a user's interaction with a computer system.

BACKGROUND OF THE INVENTION

Modern Graphical User Interfaces (GUIs) for computer systems present information to users inside content frames or "windows". This presentation mechanism is employed in programs operative under the Microsoft WINDOWS 95 operating system available from Microsoft Corporation, Redmond, Washington, as well as in content display mechanisms such as the Macintosh operating system available from Apple Computer, Inc., the X-Windows computing environment, etc.

In such GUIs, each window presents information of a particular type. For example, one window may display a letter in progress, while another shows the status of an electronic mailbox, while a third window lists the contents of a user's hard drive. Windows are often displayed on a user's computer display screen in an area metaphorically referred to as the "desktop". Just as pieces of paper on a real desk top can overlap one another, windows on a computer desktop are drawn in a "z-order" that specifies which windows are drawn on top of other windows. The window with the highest z-order is the topmost displayed window, and may obscure portions of underlying windows with lower z-order.

A particular problem encountered in conventional GUIs is the management of multiple windows so that the right content is available to the user when he or she wants to see it. For example, if a window containing a listing of files (e.g., the WINDOWS 95 Explorer) is overlapping the user's letter, the user will be unable to work on the letter without first adjusting the display or changing the z-order of the windows on the desktop so that the letter is no longer obscured by the file listing window. Similarly, if the user later decides to access electronic mail, he or she needs to first make sure that neither the letter nor the file listing window obscures the electronic mailbox.

The conventional solution to the problem of z-order display is to allow the user to change the z-order of windows on the desktop so that a desired and selected window overlaps all other windows. In most GUIs, clicking on any visible part of a window with a mouse pointer will bring it in front of all other windows on the desktop by assigning to it the highest z-order in the paint order of window display. Although this lets the user view the window he or she needs for a particular task, it generally obscures other information on the desktop. Furthermore, if no part of the desired window is visible because the desired window is completely covered by a larger window, then the user must resort to other commands, e.g., via clicking on the desired window in the WINDOWS 95 task bar, navigating to the desired window via the WINDOWS 95 Explorer, or by clicking on an icon which causes display of the available windows for selection by pointing with the mouse.

Furthermore, there are situations in modern computer systems where a user may wish to maintain the display of a selected window on top of all other windows at all times. Typically, these are displays associated with computer functions for which the user may wish quick access to provide a command or to observe the progress of a task in progress. Examples include the display of a help function, a file download status indicating window, a video window, an audio control panel window, or any other type of windows that the user wishes to maintain in a highly accessible state.

To help users arrange information on the desktop in a more stable and persistent fashion without necessarily hiding any valuable information, many modern computer systems provide a GUI wherein windows can be moved across the desktop, just like pieces of paper can be repositioned on a physical desktop. In addition, modern GUI windows typically carry several controls that allow the user to resize the display area of the window—if the window is too large to fit on the desktop "as is", the user can shrink it to fit the available space or to assume a more desirable size. By adjusting the sizes and positions of various windows, a user can often arrange his or her desktop to show several different types of contents at the same time.

Even though this approach to resizing and repositioning windows allows some degree of control over ready access to desired windows, users in modern computer systems are finding that they have more information to work with than they are able to fit on a desktop at one time. Modern integrated application suites such as OFFICE 97—which provides a word processing, spreadsheet, electronic mail, Internet browsing, database, and other types of application programs—provide myriad possibilities for information display; users are beginning to create content in one application program that is linked or embedded into another application program, thereby necessitating management of multiple windows. Present day display technology does not provide enough display screen "real estate" to display all that can be displayed.

The WINDOWS 95 task bar is an example of a known solution to this problem. The WINDOWS 95 task bar is a small strip-like window that is displayed at the bottom most position on the desktop and used to control the visibility of other windows on the screen. The task bar provides miniature representations of the active windows, which themselves may be completely "buried" by other information or windows on the desktop. In order to avoid covering up the windows itself, the task bar can be set to appear only when the user's cursor hovers near the lower edge of the screen. When the user moves the pointer away from the task bar, it disappears again to display more of the desktop.

All of these known methods of managing window positions, sizes, and displays, require the user to explicitly decide where on the desktop a window should appear, however. Whenever a user encounters a situation in which one window obscures another, he or she must rectify the problem by moving a window or changing one of the two windows.

Accordingly, there is a need for an improved method and system for managing the simultaneous display of multiple windows in a graphical user interface. An acceptable solution would preferably address the shortcomings in prior art systems wherein a user must employ multiple step operations such as manually locate a selected window for display, navigate through a list of active windows, resizing and reposition windows so as to reveal a desired window, access a desired window through a task bar, etc. Preferably, the solution would allow the user to select a particular window to be maintained in the highest display position (highest z-order) so as to be consistently available, yet behave in such a fashion that the display of the topmost window does not interfere with the user's interactions with a selected underlying window.

SUMMARY OF THE INVENTION

The present invention provides a solution to the problem of maintaining a selected window in the topmost display position without interfering with an active underlying window. Briefly described, the present invention provides continuous, automatic adjustments to window size and position of a selected topmost window (or other selected window) based on analysis of a user's interactions with the computer. A selected "target" window that is obscuring useful content in another window is automatically moved to reveal the content in the underlying window in response to a triggering condition that indicates that the user desires to access information underlying the target window. The user need not interrupt his or her work to explicitly adjust window size or position, adjust the z-order of windows, reselect a particular window with a task bar, etc.

More particularly described, a system constructed in accordance with the present invention monitors a user's interaction with a computer system to determine whether a target window—which is preferably selected to be the topmost display order and can be any type of window—may be obscuring the content of an underlying or "primary" window with which the user is working. The system determines that the target window is "in the way", i.e. obscuring content in an underlying window, by detecting a triggering condition provided to the primary window through the user interface controls such as a mouse, keyboard, etc. In response to the triggering condition, a new location for the target window is computed and the target window is redrawn in that position. Typically, the redrawn target window moves in a predetermined direction in a sufficient amount to move out of the way. In some cases, the target window is temporarily hidden instead of moved. Furthermore, the system monitors the user's interactions with the target window and is operative to reduce the size of the target window when the user has not used the content or accessed the target window for a predetermined period of time.

The present invention provides at least three different ways to keep a target window from obscuring the content of an underlying window:

1. Move Away. The system is operative to move the target window to a different location on the display screen to "get out of the way" of the area that the user has indicated in the primary or underlying window. When moving the target window, the system defines a quadrilateral content area which is to be avoided, as well as a larger rectangular area outside of which the target window should not be moved (called the "container"). The target window is automatically moved in accordance with a decision process described in detail herein.

2. Disappear. The target window "disappears" momentarily while the user executes an action and reappears once the action is completed. Typical actions that cause the target window to disappear in the present invention rather than move away are those in which the user is dragging an object to a point in the content area of the primary window that is obscured by the target window.

3. Reduce. The system is operative to reduce the size of the target window to a smaller, less obscuring size if it is not accessed within a predetermined time period, e.g. five minutes.

More particularly described, the present invention provides improvements to a computer system graphical user interface including a display and a user interface input device, in the form of a method for displaying a target window relative to a primary window. In the preferred method, a primary window is displayed on the display, the primary window comprising a predetermined region for displaying information and/or receiving user commands. A target window is also displayed, the target window comprising a predetermined region for displaying information and/or receiving user commands, the target window being displayed in a higher z-order relative to the primary window.

A container area is defined on the display, the container area comprising a predetermined area within which the target window is allowed to move. A plurality of predetermined anchor points are defined on the display, each anchor point defining a different predetermined fixed location on the display.

In response to a user operation with the user interface input device relative to the display, an avoidance region is defined in the container area, the avoidance region comprising a predetermined region defined by a user avoidance region defining operation within which the target region should not be displayed. In response to a predetermined trigger condition associated with the user avoidance region defining operation, a move count comprising the number of times that the target window has been moved within a predetermined time period is determined.

In response to the move count exceeding a predetermined value, a determination is made whether a redraw of the target window at a location associated with a selected one of the plurality of anchor points would result in display of the target window without overlapping the avoidance region. In response to a determination that a redraw of the target window at a location associated with one of the plurality of anchor points would result in display of the target window without overlapping the avoidance region, the target window is redrawn at a location associated with the selected anchor point.

However, in response to (1) a determination that a redraw of the target window at a location associated with one of the plurality of anchor points would result in display of the target window overlapping the avoidance region, or (2) a determination that the move count does not exceed the predetermined value, a determination is then made whether the target window can be redrawn displaced a predetermined minimal distance away from the avoidance region.

In response to a determination that the target window can be redrawn displaced a predetermined minimal distance away from the avoidance region without overlapping the avoidance region, the target window is redrawn at a location displaced a predetermined minimal distance away from the avoidance region along a line toward a second selected anchor point. However, in response to a determination that the target window cannot be redrawn displaced a predetermined minimal distance away from the avoidance region without overlapping the avoidance region, the amount of overlap of the target window with the avoidance region at each of the plurality of anchor points is determined.

Finally, the method involves steps for selecting the particular anchor point that results in minimized overlap of the target window with the avoidance region, and redrawing the target window at a location associated with the particular anchor point that results in minimized overlap of the target window with the avoidance region.

Accordingly, it is an object of the present invention to provide a system and methods for managing the simultaneous display of multiple windows in a graphical user interface which provides continuous, automatic adjustments to window size and position based on analysis of a user's interaction with the computer.

It is another object of the present invention to provide a graphical user interface that allows a selected topmost or target window to be maintained in a topmost position and highest z-order yet automatically moved or temporarily obscured in response to predetermined triggering conditions indicative of a user's desire to access underlying content in a primary window.

These and other objects, features, and advantages of the present invention may be completely understood with the detailed description of the preferred embodiment of the invention provided below and by inspection and review of the accompanying drawing figures.

BRIEF DESCRIPTION OF THE DRAWINGS

FIG. 2 is a flow diagram of the overall functional operation of the preferred embodiment of the present invention.

FIG. 3, consisting of FIGS. 3A and 3B, illustrates the principles of a minimal biased move of the target window toward an anchor point in accordance with the invention.

FIG. 4, consisting of FIGS. 4A and 4B, illustrates the principles of minimized overlap of the target window with the avoidance region at an anchor point in accordance with the invention.

FIG. 6 is a flow diagram of the FObscure function in accordance with the invention.

FIG. 9, consisting of FIGS. 9A and 9B, graphically illustrates operation of the MoveAway function in response to a trigger comprising insertion of text and line wrap.

FIG. 11, consisting of FIGS. 11A and 11B, graphically illustrates operation of the MoveAway function in response to a trigger comprising a command to view a header and/or footer in a document.

FIG. 12, consisting of FIGS. 12A and 12B, graphically illustrates operation of the MoveAway function in response to a trigger comprising a command to view a comment or annotation in a document.

FIG. 13, consisting of FIGS. 13A, 13B, and 13C, graphically illustrates operation of the MoveAway function in response to a trigger comprising a command to view or insert a footnote in a document.

FIG. 14, consisting of FIGS. 14A and 14B, graphically illustrates operation of the MoveAway function in response to a trigger comprising a command that causes display of a dialog box.

FIG. 15, consisting of FIGS. 15A and 15B, graphically illustrates operation of the Obscure function in response to a trigger comprising a drag operation.

FIG. 16, consisting of FIGS. 16A and 16B, graphically illustrates operation of the Obscure function in response to a trigger comprising a resizing operation.

FIG. 17, consisting of FIGS. 17A and 17B, graphically illustrates operation to reduce the size of the target window in response to a trigger comprising elapse of time.

DETAILED DESCRIPTION OF THE DISCLOSED EMBODIMENT

The present invention provides a method for managing the simultaneous display of multiple windows and a graphical user interface, by providing continuous, automatic adjustments to window size and/or position based on analysis of a user's interaction with the computer system. A window that obscures useful content in another, lower window in z-order is moved by the invention to reveal the content of the underlying window. The user need not interrupt his or her work to adjust window size or position, access a task bar, or use another user interface device to select the desired window for reappearance.

Figure 1:
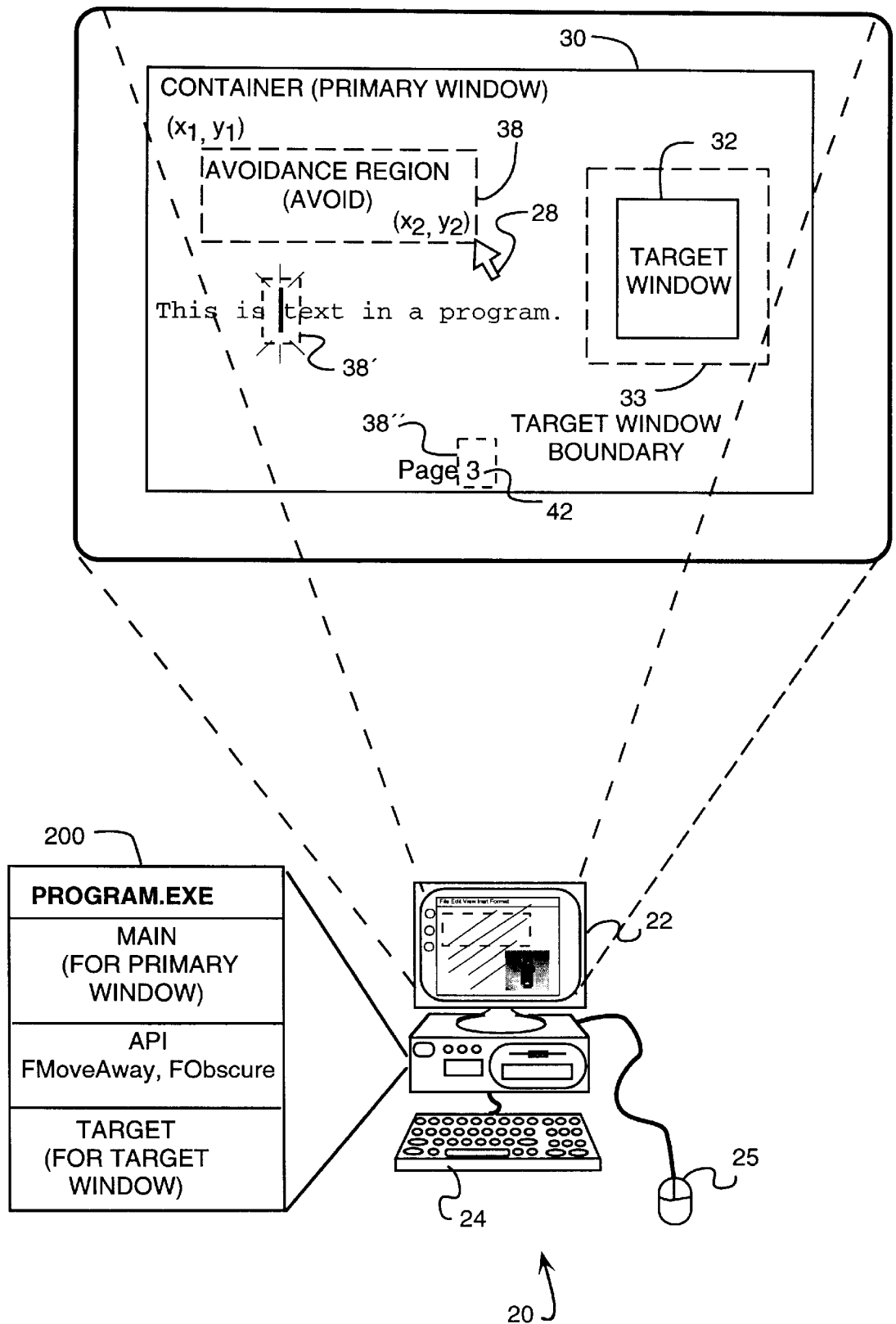
FIG. 1 is a diagram of a computer system with display of a primary window and a target window, illustrating the principles of the invention.

Referring now to the drawings, in which like numerals indicate like elements throughout the several figures, FIG. 1 illustrates a typical computer system 20 in which the present invention is operative. The disclosed and preferred methods of the invention run as a computer program or process that runs in the computer system 20 which comprises a central processing unit (CPU), display such as a computer monitor 22, main memory such as random access memory (RAM), permanent read/write memory such as hard drive, floppy disk, network storage, etc., keyboard 24, and pointing device such as a mouse 25. The mouse 25 typically moves a cursor or pointer 28 on the display that is used to select data elements for manipulation, activate menus, position an insertion bar, etc. Such elements of a computer apparatus 20 are known to those skilled in the art and will not be described further herein.

As is known, the computer apparatus 20 is operative to cause the display of graphic elements on the computer monitor or display screen 22. The graphic display on the display screen is the result of a user's interaction via the keyboard and/or mouse with an application program and/or computer operating system software running on the computer system. The display screen 22 typically displays one or more "windows" or "views" of information stored in the computer, which information can be processed, manipulated, stored, communicated, etc. with the computer system.

The computer system 20 is operative in the known manner to execute or run an application program wherein the computer system, under control of the application program, is operative to display data on the display 22 and modify the data in accordance with user commands provided by the keyboard 24 and/or mouse 25 such as by typing characters, applying formatting, selecting characters or objects for editing or other manipulations, etc.

In particular, the computer system 20 is understood to execute an application program that provides a primary window 30 in which the information associated with a particular application program is displayed and which is operative to receive commands such as by pointing, clicking, selecting, etc. For purposes of the present invention, the primary window 30 is considered a "container" relative to which a secondary or "target" window 32 is displayed. The primary window 30 provides a region on the display 22 within which information associated with a selected computer program is displayed and into which user commands such as typing, selecting, clicking, etc. are provided.

The target window 32, which may be associated with a different computer process than the primary window 30, comprises a distinct region on the display 22 that displays content and receives user interaction. The target window 32 preferably includes a predetermined boundary region 33 that extends at a predetermined distance around the outer periphery of the target window. The target window boundary defines a "slop" or buffer region associated with the target window, and facilitates movement of the target window sufficiently far from the region of an activating triggering condition to minimize the likelihood of a premature retriggering.

Typically, it is desired that the target window 32 be displayed in a higher z-order than the primary window 30, such that the target window may obscure content displayed in the primary window at any given time. In accordance with the invention, the target window 32 is moved, hidden, reduced in size, etc. in accordance with user interaction. Such user interaction will be typically indicated by the user typing with the keyboard 24, or moving the mouse 25 to cause the cursor or pointer 28 to move on the display screen 22. Specific types of user interaction events, often involving the cursor, comprise triggering events in the invention. Those skilled in the art will understand that operations with the cursor 28 include creation of a selection rectangle, clicking on objects, activating menus and/or control objects in menus, double clicking on objects to activate them, clicking and holding an object to "drag" the object or selection to a different location, etc. These and other types of user interactions can be triggering events.

In accordance with the invention, the user will indicate and create one or more triggering events by interaction with the keyboard and/or mouse, which will then cause the desired action of moving, hiding, etc. the target window 32. Of particular importance is the notion of avoidance of a selected region in the primary window 30. FIG. 1 shows an avoidance region 38 displayed within the primary window 30. A system constructed in accordance with the invention will respond to creation of an avoidance region by moving, hiding, reducing, etc. the target window so that it does not obscure content displayed in the avoidance region.

In the example shown in FIG. 1, the avoidance region 38 is defined by the action of pressing the mouse button at a particular starting position $(x_1, y_1)$ relative to the primary window, dragging to a terminal position $(x_2, y_2)$ while holding the mouse button pressed, followed by releasing the mouse button at $(x_2, y_2)$. In operating systems such as the WINDOWS 95 operating system, the Apple Macintosh operating system, and other known operating systems, such clicking and dragging action with the cursor results in selection of objects, text, etc. that lie in the region bounded by the rectangle 38.

Other triggering mechanisms are also contemplated in the present invention. Typically, such mechanisms result in the definition of an avoidance region such as that shown at 38. Accordingly, although a single example of clicking and dragging has been described for defining an avoidance region, it will be understood by those skilled in the art that other operations can also result in the creation of an avoidance region. For example, the following user actions are types of user interactions that define avoidance regions relative to a primary window:

1. Selection of text or objects by definition of a rectangle bounding the selection with a click and drag operation, as shown in FIG. 1.

2. Any type of drag operation, not necessarily limited to text selection, such as by clicking at a predetermined beginning point and dragging to an ending point followed by release of the mouse button. Such action defines an avoidance region comprising a rectangle bounding the point at the beginning of the drag (pressing the mouse button) and ending at release of the mouse button. This action is particularly applicable in graphics programs, spreadsheets, object-oriented interfaces with the operating system or with application programs, etc.

3. The insertion point (IP) 40 itself, as defined by a bounding rectangle extending a predetermined distance around the insertion point. This rectangle is indicated at 38' in FIG. 1 relative to the insertion point 40.

4. Insertion of text at an insertion point (IP) positioned a distance away from the target window which causes text to wrap "from" a particular line "to" another line a distance downstream in the text from the insertion point, defining a rectangle bounding the line wrapped "from" and a number of subsequent lines.

5. Display of a page number such as that shown at 42 in FIG. 1 with a corresponding bounding rectangle shown at 38" defining the avoidance region.

6. Display of "features" panes such as viewing or inserting headers and/or footers in text, viewing or inserting comments or annotations, viewing or inserting footnotes, etc. Such actions result in definition of an avoidance region comprising a rectangle bounding the header and footer pane, comment pane, footnote pane, etc. Examples of these are shown in connection with FIG. 12 and FIG. 13.

7. Display of a dialog box as a result of a user action via keyboard, mouse, etc. Such action defines an avoidance region comprising the boundary of the dialog box. Examples of these are shown in connection with FIG. 12 and FIG. 13 and FIG. 14.

8. A resizing operation such as when a user selects a resizing "handle" associated with an object, with the dragging of the handle thereby defining the avoidance region. An examples of this is shown in connection with FIG. 16.

Although the foregoing mechanisms are preferred trigger mechanisms provided in the present invention, those skilled in the art will understand that other types of triggering mechanisms can be defined and would also be useful in the present invention, e.g., the appearance of "popup" menus or "drop down" menus, a command to activate a subframe or subpane, a drawing action with a graphics tablet pen or mouse, selection of an object having an obscured portion underlying the target window, etc.

Still referring to FIG. 1, the computer system 20 is operative to run one or more computer programs to provide the functionality described herein. An exemplary computer application program labeled PROGRAM.EXE 200 includes code associated with a program MAIN and a program TARGET, with an application program interface (API) for controlling communications therebetween. The programs MAIN and TARGET provide two separate computer processes or functions, which may but need not be related.

It should be understood that in the preferred embodiment of the invention, in the context of an integrated suite of computer application programs, both the primary window and the target window are hosted in an application program's main process, such as a word processing program.

The API defines entry points by which a running program can call into a DLL (dynamically linked library of code) to access its functions and procedures. It will therefore be appreciated that the invention could be readily implemented with two completely independent computer processes, within a computer application program, or in any other context involving management of different windows, regardless of the processes which "own" the windows or the code therefor.

In the disclosed embodiment, two principal computer processes cooperate and/or communicate with one another in order are involved to provide the functionality of the present invention. A first or main computer process associated with the program or code designated MAIN in FIG. 1 is operative to cause the functionality associated with the primary window 30. By way of example and not limitation, the MAIN may comprise a word processing program, a spreadsheet program, a database, an Internet browser, an electronic mail program, a graphics program, a presentation program, etc. Such a first or main computer process may also constitute a subprogram or module within a more complex application program.

Likewise, a second computer process, typically resulting from separate computer code, is provided for generating the target window 32 and handling the display of information and receipt of user commands relative to the second process. In FIG. 1, a program denominated TARGET is associated with the target window 32 and causes the functionality associated with the target window. For example, the TARGET program or code may be a help assistant program, a video display screen, a control panel for control of multimedia devices, or any of a number of different types of computer processes that a user desires to be readily accessible and displayed "on top" of a primary window that may be employed.

Of particular relevance to the present invention is the notion of employing the second process to provide a help function. The disclosed preferred embodiment of the present invention comprises a "help assistant" resultant from the second process, a personalized and animated character that is displayed to help a user learn about and use another, related application program. In the disclosed embodiment, the help assistant is preferably maintained at the top z-order so as to be available to present suggestions to the user, provide an entry field for context-sensitive help file searching, and access to help files in general. The remaining discussions of the present invention will revolve around the particular example of an animated, personalized "help assistant" that is displayed in the target window 32 to provide helpful to tips to a user of the primary program as well as access to help files. Those skilled in the art will understand that this example of a "help assistant" is by way of example and not limitation.

In order to implement the relationship between the target window 32 and the primary window 30, an application program interface (API) is provided so that the computer process comprising the MAIN and the computer process comprising the TARGET can communicate and provide the relocation, resizing, repositioning, etc. of the target window 32 relative to the primary window 30. In particular, the API employed in the preferred embodiment of the present invention provides two particular functions FMoveAway and FObscure. These functions, as will be described in greater detail below, allow the computer process controlling the primary window to pass messages to the computer process controlling the target window, detect triggering conditions, and pass messages to the target window process to cause the desired action of relocation, temporary disappearance, etc.

FIG. 2 is a flow diagram of the overall functional operation of the present invention in the context of a main program 200 comprising a first computer-implemented process for controlling the display of and interaction with a primary window, and a second computer-implemented process controlling for controlling the display of and interaction with a target window. These processes are carried out as code associated with the executable application program PROGRAM.EXE 200 running in the system 20 (FIG. 1). Whenever the system 20 is activated to cause display of the primary window and/or target window, the program 200 is invoked to carry out the steps associated with the preferred embodiment of the present invention.

The first step taken at 201 is to invoke a process for initializing and displaying the primary window 30. Next at 202, a process is invoked to initialize the target window and cause its display in a higher z-order than that of the primary window. Once the primary window process and target window process are initialized, control passes to step 205 to wait for a user command.

When a user input is received, the command is tested by decisions 210, 212, 214, 216 wherein control passes to a process to call a function FMoveAway 500 if a "move" trigger is detected, control passes to a process 600 to call a function FObscure if a "hide" trigger is detected, control also passes to the process 600 to call the function FObscure if a "show" trigger is detected, and control passes to a process 1100 if a command associated with the target window is detected, respectively. If at decision 216 no "move" trigger, "hide" trigger, "show" trigger, or target window command is detected, control passes to process 1200 and a primary window command process is executed to carry out a command which is presumably at this point intended for the primary window. It will thus be appreciated that the steps shown in FIG. 2 are operative primarily to detect whether interaction with the target window is desired, or whether the target window should be moved, obscured, or redisplayed in response to a triggering condition. If not, the default condition is to pass the command to the first process associated with the primary window.

Once a selected process is completed, control returns to item 205 to wait for the next user command.

It should be understood that the steps shown in FIG. 2 are in the context of a control loop in a typical object-oriented GUI such as an application program running in the WINDOWS 95 operating system environment or the like. Specifically, those skilled in the art will understand that a user's interactions with the computer system by pointing and clicking, clicking and dragging, typing, etc. generate user interface "events" which are processed by the computer system to carry out the user's command. For example, a click on an object displayed on the screen by pressing a mouse button results in what is termed a "mouse down" event, and a release of the mouse button is termed a "mouse up" event. A dragging operation is interpreted when there is a mouse down event during movement of the mouse, i.e. the mouse button is held down while the mouse is moved.

As will be understood from later discussion, the "hide" trigger and the "show" trigger are specific examples of such user interface events that cause the temporary hiding or redisplay, respectively, of the target window. For example, a "hide" trigger in the disclosed embodiment occurs when the user drags an object on the display screen—thereby creating an avoidance region—into the area of the target window. The hide trigger is generated by a maintained mouse down event and movement of the mouse, with mouse coordinates intersecting those of the target window. Other types of hide triggers are also contemplated, e.g. a resize operation of an object into the area of the target window.

Similarly, by way of example, a "show" trigger is generated in the disclosed embodiment when the user releases the mouse button and it is determined that the coordinates of the mouse do not intersect the target window. Such action indicates that it is appropriate to display the target window (or redisplay it, if previously hidden). For example, release of a resizing handle on a graphic object typically results in a show trigger.

Prior to discussing specific aspects of the FMoveAway and FObscure functions, turn next to FIG. 3, consisting of FIGS. 3A and 3B, for a discussion of the preferred manner in which the target window 32 is moved in response to detection of a "move" trigger. As will be described in greater detail below, the FMoveAway function is operative to move the target window to a different location. The logic for determining the new location is described in connection with later figures. Briefly stated, the system is operative to detect the number of times that the target window has moved within a predetermined time period. If the target window has not been moved "too often", the system is operative to conduct what is termed a "minimal biased move". This operation tends to move the target window toward a predetermined corner or "anchor". For many applications, the bottom-right corner is considered the main anchor and the minimal biased move will tend to migrate the target window in the direction of the main anchor. This is shown in FIG. 3A at 60, for anchor labeled anchor no. 3.

However, there are conditions in which the target window will reach the main anchor, or for which other considerations will be applied to move the target window towards another anchor, such as anchor no. 1 shown at 62 or anchor no. 2 shown at 63. In the preferred embodiment, in the event that the target window cannot be placed at a selected one of the anchors, it is placed at a position of minimized overlap of the target window with respect to the avoidance region 38.

FIG. 3A illustrates a situation wherein the target window 32, with its associated boundary 33, is detected to be within the avoidance region 38. Upon detection of the triggering condition, the coordinates of the avoidance region, $(x_1, y_1)$, $(x_2, y_2)$ are passed to the function FMoveAway. FMoveAway then moves the target window. Preferably, a minimal biased move is carried out.

In order to effectuate a minimal biased move, the target window is moved a minimal distance to avoid the overlap region, biased in the down and right directions. When an overlap of the target window 32 with the avoidance region 38 is detected, four distances are computed, e.g. as measured from the upper left-hand corner of the target window 32, having global coordinates $(X_{T1}, Y_{T1})$. As shown in FIG. 3B, these are:

(1) the distance (D1) required to move the target window 32 and its boundary 33 upwardly to clear the avoidance region, at a proposed relocation site of T1;

(2) the distance (D2) required to move the target window and its boundary down to clear the avoidance region, at a proposed relocation site of T2;

(3) the distance (D3) required to move the target window and its boundary to the left to clear the avoidance region, at a proposed relocation site of T3; and (4) the distance (D4) required to move the target window and its boundary to the right to clear the avoidance region, at a proposed relocation site of T4.

Distances D1 and D3 are multiplied by a biasing factor of 1.5. Then, the smallest value is determined, and the target window moved to the location associated with the smallest value. In other words, the relocation site for the target window is chosen from the smallest of 1.5*D1, D2, 1.5*D3, or D4. In the example shown in FIG. 3B, the target window will be relocated to site T2, since D2<D4<1.5*D1<1.5*D3.

The result is the repositioning of the target window from that at 32 in FIG. 3A to that at T2 in FIG. 3B, where the target window now is clear of the avoidance region by a predetermined but minimal distance, namely at least that of the target window boundary 33, biased in the down and/or right directions.

FIG. 4, consisting of FIGS. 4A and 4B, illustrates the principles of a minimal biased move under the condition that overlap of the target window 32 and/or its boundary 33 with the avoidance region cannot be avoided. Such a situation can occur (1) when the target window has been repeatedly moved until it is "forced" into the corner, or (2) if the avoidance rectangle is very large. In these situations, the target window may wind up aligned with an anchor point—typically with the lower right hand corner aligned with the anchor point 60. In accordance with the invention, the system will place the target window at a selected one of a plurality of anchor points such that the amount of overlap of the target window with the avoidance region is minimized.

In FIG. 4A, assume that the target window 32 is positioned with its upper left-hand reference point $(X_{T1}, Y_{T1})$ within the avoidance region 38, and a minimal biased moved is attempted. However, note that it is impossible to move the target window (within the container) such that it does not overlap with the avoidance region. In accordance with the invention, steps are taken to cause the relocation of the target window such that its overlap with the avoidance region is minimized.

In FIG. 4B, note the overlap region shown at 70a between the target window 32a and the avoidance region 38. In accordance with the invention, the size of the overlap region 70a is recorded temporarily, and further steps are taken to determine if placement of the target window in association with one of the other anchor points would provide a lesser overlap. Note the overlap region 70b that would result if the target window is placed at the position shown at 32b, which is in association with the anchor no. 1. Likewise, note the overlap region 70c which would result if the target window is moved to the position 32c associated with anchor no. 2.

The preferred system will determine that the minimum overlap is that shown at 70c, which would result if the target window is repositioned to 32c. Therefore, rather than displaying the target window at 32a or 32b, a system constructed in accordance with the present invention will display the target window at 32c.

Turn now to FIG. 5 for a discussion of the FMoveAway function 500 that operates in accordance with the preferred embodiment of the present invention. The FMoveAway function receives two rectangular parameters, prcAvoid and prcContainer, which are pointers to the boundaries of the avoidance region and to the container region, respectively. These parameters comprise absolute screen coordinates that are passed in by a calling process and instruct the system as to the region which the target window is to avoid and the region in which the target window should remain confined.

According to one aspect of the invention, if the target window has moved more than a predetermined number of times in a predetermined number of minutes, the system will automatically move the target window to an anchor point, under the assumption that the user would prefer to move the target window well out of the way. Steps for this aspect of the invention are shown in FIG. 5A. In this embodiment, steps for a minimal biased move will be taken if it is determined that the window has not been recently moved "too often."

However, according to another aspect of the invention the steps for a minimal biased move can be taken without regard to how often the target window has been recently moved. An embodiment thus constructed would begin immediately with steps shown in FIG. 5B and skip the steps shown in FIG. 5A.

Starting with the optional steps in FIG. 5A, beginning at 501, the first (optional) step taken is to set a parameter MoveCount to a number indicative of the number of moves of the target window within a predetermined time period. This constitutes the parameter NumberOfMoves divided by ΔTime. The system is optionally operative to maintain a running average of the number of times that the target window has been moved within a predetermined time period, say five minutes. Also at 501, the value of a parameter ANCHOR is set to the value of the number of anchor points NumberOfAnchors, which is 3 in the preferred embodiment, although it would be understood that more or fewer anchors may be provided if desired.

As described as an optional operation, if the target window has moved too often, for example five times in three minutes, the system will automatically move the target window to an anchor point under the assumption that the user would prefer to move the target window well out of the way. Thus, at (optional) decision 504 the inquiry is made whether the value MoveCount exceeds a predetermined value A. If so, it is an indication that the target window has moved an excessive number of times. If MoveCount is not greater than A, the NO branch is taken to FIG. 5B and steps associated with a minimal biased move are taken. If the value of MoveCount is greater than A, the YES branch is taken to step 510. At step 510, a determination is made as to the amount of overlap of the target window with the avoidance region at the main or principal anchor, which it will be recalled from FIG. 3 is the anchor no. 3 shown at 60.

Figure 5B:
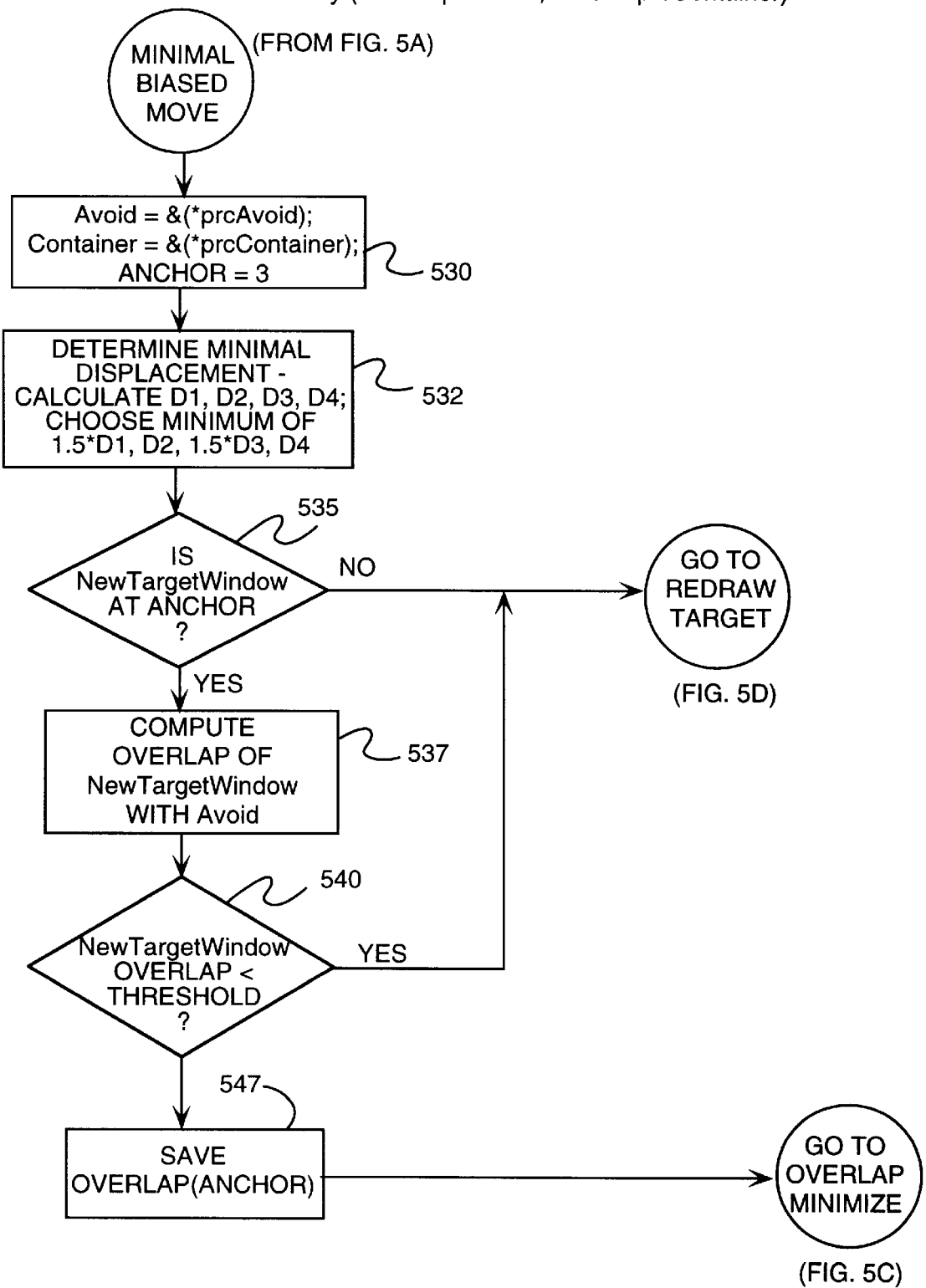
FIG. 5, consisting of FIGS. 5A, 5B, 5C, and 5D, is a flow diagram of the FMoveAway function in accordance with the invention.

At decision 512, the inquiry is made whether the overlap equals zero. If so, it is acceptable to place the target window at the main anchor, and the YES branch is taken to redraw the target, by executing steps as shown in FIG. 5B. If the overlap is not zero, the NO branch is taken to decision 515.

At 515, the inquiry is made whether the variable ANCHOR equals zero, indicating that all possible anchors have been examined for the amount of overlap with the avoidance region. If there are remaining anchors to examine, the NO branch is taken to step 518, the parameter ANCHOR is decremented, and the program loops back to 510 to determine the overlap of the target window at the next anchor.

Figure 5C:
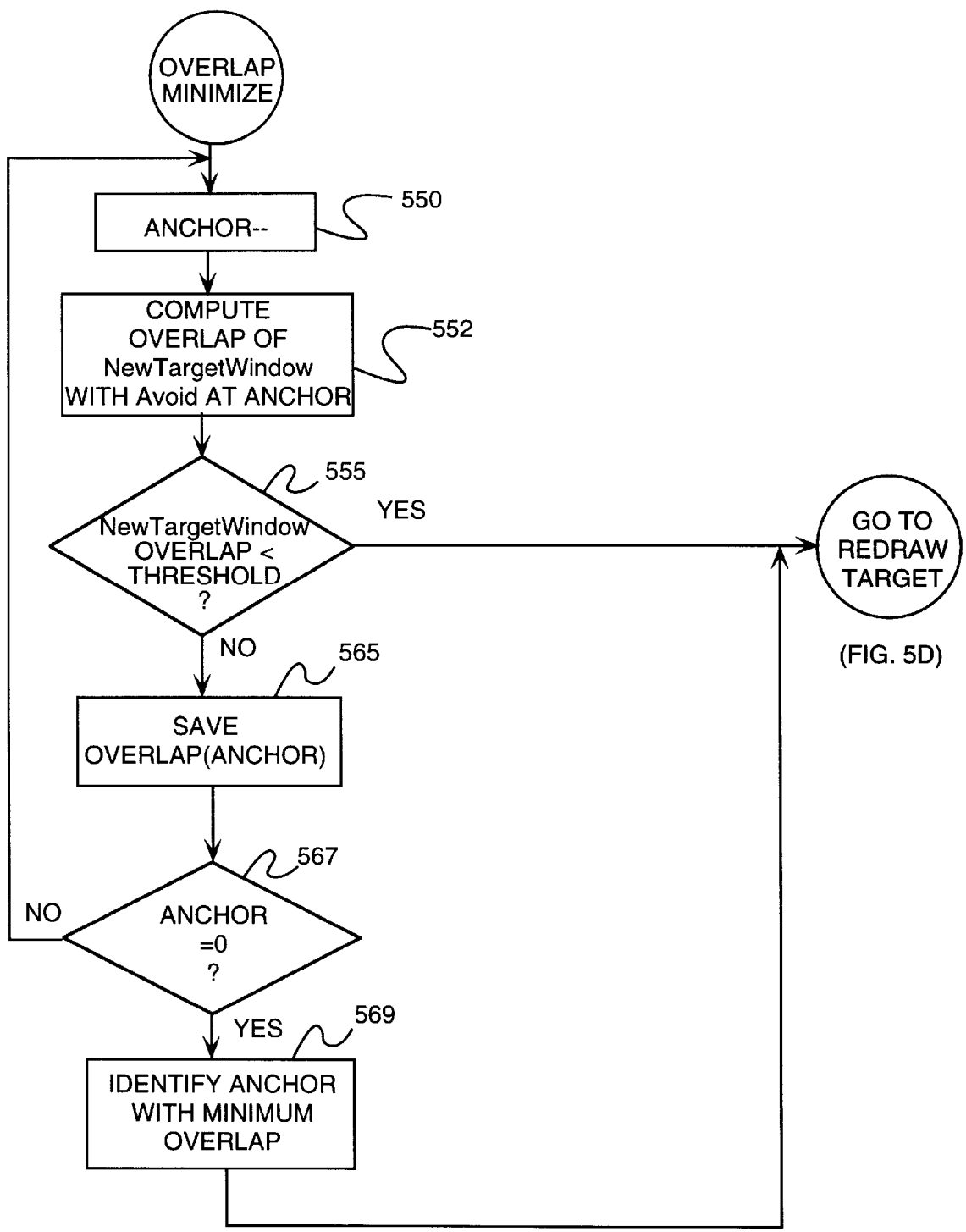

If at decision 515 all anchors have been examined by indication that ANCHOR equals zero, the YES branch is taken to minimize the overlap, with the steps as indicated in FIG. 5C.

FIG. 5B illustrates the steps taken to carry out a minimal biased move, the principles of which are illustrated in FIG. 3. This is the operation of the presently preferred embodiment. At step 530, a parameter Avoid is set to the value of the passed-in variable prcAvoid, and thereby defines the rectangular region that is to be avoided by movement of the target window. Also, the value of a variable Container is set to the rectangular value indicated by the passed-in parameter preContainer. Finally, the value of an anchor counter ANCHOR is set to 3, the number of anchors being considered as possible anchors for placement of the target window.

At step 532, the system determines the minimal displacement for the possible redrawing of a new target window, identified as NewTargetWindow, within the rectangle Container. As illustrated in connection with FIG. 3, this involves the determination of the distances D1, D2, D3, D4, the selection of the proposed location of the new target window associated with the minimum of 1.5*D1, D2, 1.5*D3, or D4. Control then passes to decision 535.

At decision 535, the inquiry is made whether the NewTargetWindow is at the anchor indicated by the value of ANCHOR. If not, the NO branch is taken to steps indicated in FIG. 5D and the target window is redrawn at the indicated position computed as illustrated in connection with FIG. 3. This would occur under circumstances where there is sufficient room to move the NewTargetWindow toward the anchor, biased toward the anchor, a sufficient distance to clear the avoidance region.

If at decision 535 it is determined that the NewTargetWindow is at the indicated anchor, the YES branch is taken to step 537. At this step, the overlap area of the NewTargetWindow with the avoidance rectangle is computed. This overlap is stored temporarily in association with the indicated anchor number, for purposes of minimization as will be discussed. Control then passes to decision 540.

At decision 540 the inquiry is made whether the overlap of the NewTargetWindow is less than a predetermined threshold. The predetermined threshold is an arbitrary value indicative of an acceptable degree of overlap of the target window with the avoidance region, so long as the NewTargetWindow is located at an anchor. If so, the YES branch is taken to steps for redrawing the target window in FIG. 5D. If not, the NO branch is taken to step 547.

At step 547, the amount of overlap of the target window with the avoidance region is temporarily saved for use in subsequent steps. Control then passes to FIG. 5C for execution of steps for minimizing overlap of the target window with the avoidance region.

FIG. 5C illustrates steps associated with minimization of the overlap of the target window with the avoidance region, while still maintaining the target window within the designated container region. Beginning at step 550, the first step taken is to decrement the ANCHOR parameter to prepare for testing placement of the target window at a different anchor. Control passes to step 552, where the overlap of the new target window at the next anchor with the avoidance region is computed. Control passes to decision 555.

At decision 555, the inquiry is made whether the NewTargetWindow overlap at the next examined anchor is less than the predetermined threshold. If so, it is acceptable to place the NewTargetWindow at the examined anchor, and the YES branch is taken to FIG. 5D and the target window is redrawn. If not, the NO branch is taken to step 565.

At step 565, the amount of overlap of the target window at the indicated anchor is temporarily saved and control passes to decision 567.

At decision 567, the inquiry is made whether all anchors have been examined, indicated by the value of the variable ANCHOR reaching zero. If not, the NO branch is taken back to step 550, and the next anchor is examined. If the last anchor is being examined, the YES branch will be taken to step 569. At step 569, the particular anchor that produced the minimal overlap of the target window is identified, such as illustrated in FIG. 4B for the target window 32c with its minimized overlap 70c. It is thereby indicated that the NewTargetWindow should be redrawn at the indicated anchor providing the minimal overlap. Control then passes to the steps in FIG. 5D and the target window is redrawn at the indicated anchor.

FIG. 5D illustrates steps associated with the FMoveAway function for redrawing the target window at the indicated location. These steps will be reached when preceding logical steps have determined that it is appropriate to redraw the target window at a selected size, at a selected position biased a certain direction, or in association with a selected anchor point.

Starting at step 580, the first action taken is to get the value of a state variable SHOW STATE, which indicates whether the target window should be displayed or hidden. Control passes to decision 582.

At decision 582, if SHOW STATE equals VISIBLE, the YES branch is taken to step 585 and the NewTargetWindow is drawn into the computer system's display memory in a higher z-order than that of the Container. The result is to draw the target window at the indicated position on top of the Container moved as indicated in prior steps.

If at decision 582 it is indicated that SHOW STATE is not VISIBLE the NO branch is taken, indicating that the NewTargetWindow should not be redrawn. The function FMoveAway exits, returning control to the calling process. Those skilled in the art will understand that the steps previously illustrated result in display of the NewTargetWindow at the indicated location displaced a minimal biased amount away from the triggering condition, and associated with an anchor if necessary.

Steps for determining the value of the SHOW STATE logical parameter are shown in FIG. 6. This figure illustrates steps associated with the FObscure function 600, which responds to predetermined trigger conditions to temporarily hide or obscure the target window or to redisplay the target window, as appropriate. As previously described, specific triggering conditions that cause the target window to disappear momentarily then reappear once the action is completed include those where the user is dragging an object to a point in the content area of the primary or Container window that is obscured by the target window. Specific illustrations of these processes will be discussed later.

The steps of the FObscure function are taken in response to the predetermined triggering condition described above, e.g. a hide trigger or a show trigger in FIG. 2. The FObscure function 600 is used to make the target window temporarily invisible when the cursor passes over the target window during what is known as a "modal tracking loop". The integer (x, y) values of the cursor associated with the tracking loop are passed in as global coordinates. If the point (x, y) is in the target window or in the target window boundary, and the target window is supposed to be visible, the target window will be temporarily hidden. If the point (x, y) is not in the target window or its boundary and the target window is not visible but would otherwise be because of the value of SHOW STATE indicating visibility, the target window is re-displayed.

It should be understood that it is possible for the target window to be positioned outside the container, e.g. if the user moves it, if there is a MoveAway in a nonmaximized case, or if the Container has a null value (i.e. no bounding container is defined). In the preferred embodiment, there is a special coordinate set (MAXINT, MAXINT) that is used to force redisplay of the target window. Accordingly, calling the method FObscure with the special coordinate set (MAXINT, MAXINT) results the SHOW STATE variable being set to indicate visibility and redisplay of the target window.

The first step taken at 601 is to get the value of the logical variable SHOW STATE, which indicates whether the target window is presently being displayed. Control then passes to decision 603.

A decision 603, the inquiry is made by examining the SHOW STATE variable whether the target window is visible or not. It should be understood that previous triggering operations could have set the value of SHOW STATE to invisible; repeated calls to FObscure should not change the state unless conditions indicate that it is appropriate to display the target window. If at decision 603 the target window is indicated as visible, by YES branch is taken to decision 605.

At decision 605, if the value of (x, y) is within the target window or its boundary, the YES branch is taken to step 608. At step 608, it is indicated that the target window should not be displayed, and the variable SHOW STATE is set to "hide" indicating that the target window is not visible. The function then exits.

If at decision 605 the passed-in coordinates are not within the target window or its boundary, the NO branch is taken, and there is no need to change the SHOW STATE variable. In this case, the NO branch is taken and the function exits.

Returning now to decision 603, if the variable SHOW STATE indicates that the target window is not visible, the NO branch is taken to decision 610.

At decision 610, the inquiry is made whether the passed-in coordinates (x, y) are within the target window or its boundary. If so, it is indicated that the target window should remain invisible, the YES BRANCH is taken which results in no change to the SHOW STATE variable, and the function exits.

If at decision 610 it is now determined that the passed-in coordinates are not within the target window or its boundaries, the NO branch is taken to step 615. Under these circumstances, it is indicated that the target window should be displayed, and the SHOW STATE parameter is set to visible so as to cause the target window to be displayed.

Figure 7A:
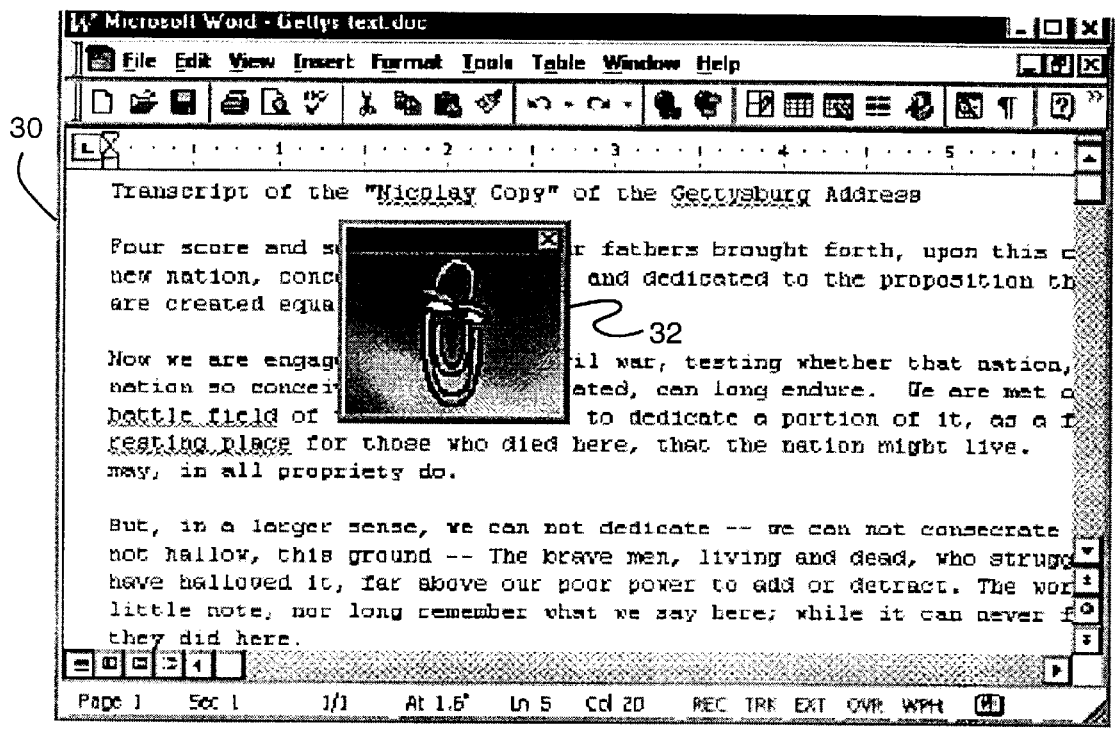
FIG. 7, consisting of FIGS. 7A and 7B, graphically illustrates operation of the MoveAway function in response to a trigger comprising selection of a string of text.
Figure 7B:
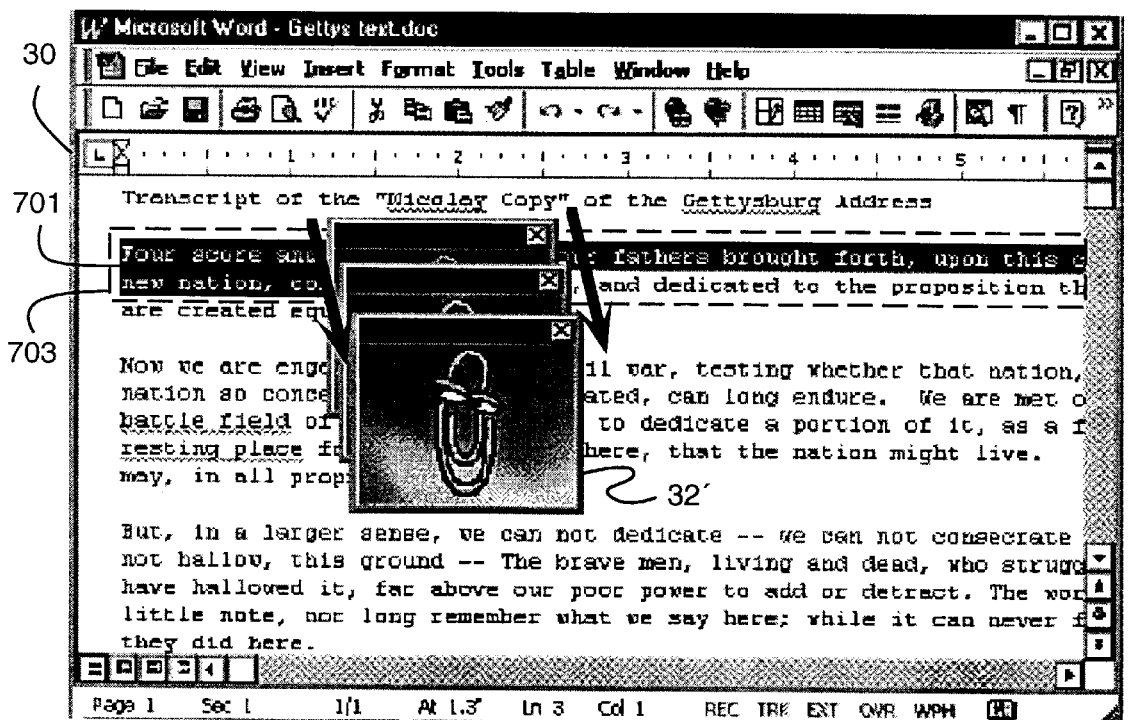

FIG. 7, consisting of FIGS. 7A and 7B, graphically illustrates operation of the FMoveAway function in the context of an exemplary application program, specifically that of the Microsoft Word word processing application. The target window 32 is displayed in a container window 30 superimposed (i.e. in higher z-order) over text displayed in the container window.

In the example given, the target window 32 is an animated character comprising a "paper clip" character that provides a help function for the user of the Microsoft Word program. By clicking within the target window 32, the user can invoke a help function to obtain information about how to operate the word processing program.

FIG. 7B illustrates operation of the MoveAway function in response to a triggering condition comprising selection of a string of text, indicated at 701. As can be seen by comparing FIG. 7A and FIG. 7B, the target window 32 has assumed a position beneath that of the selected text 701, biased to the right towards the lower right corner which serves as the main anchor (not shown). It will be appreciated that the avoidance region comprises a rectangle 703 that bounds the text selection 701.

Figure 8A:
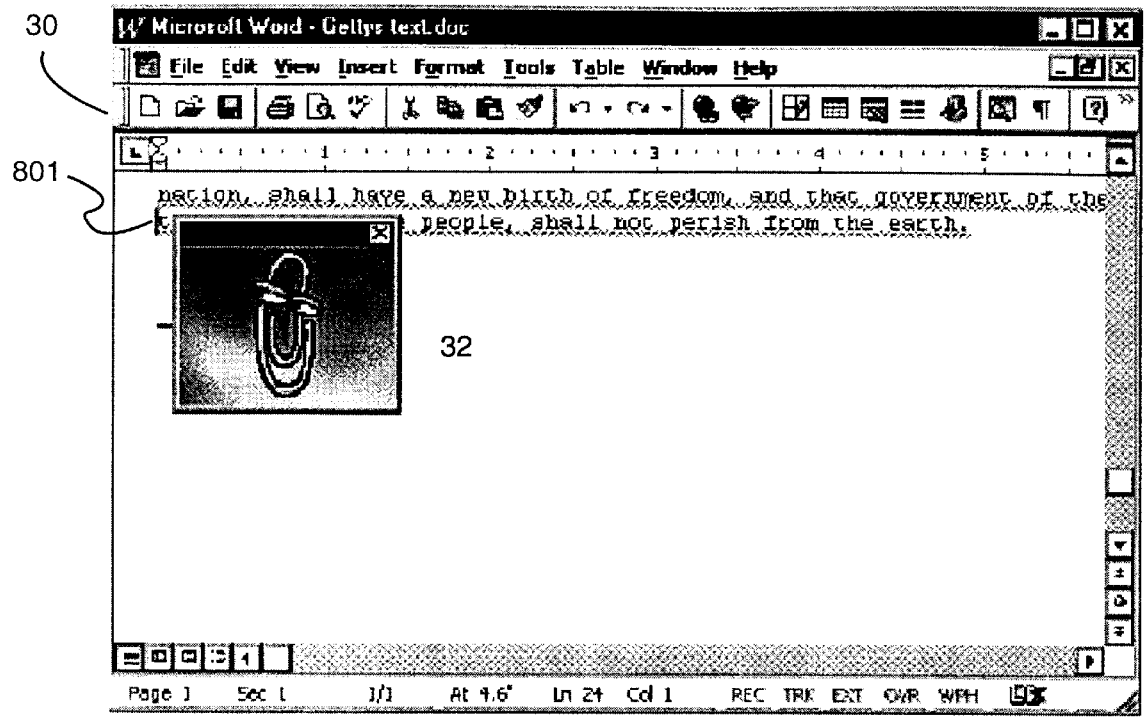
FIG. 8, consisting of FIGS. 8A and 8B, graphically illustrates operation of the MoveAway function in response to a trigger comprising movement of the insertion point (IP).
Figure 8B:
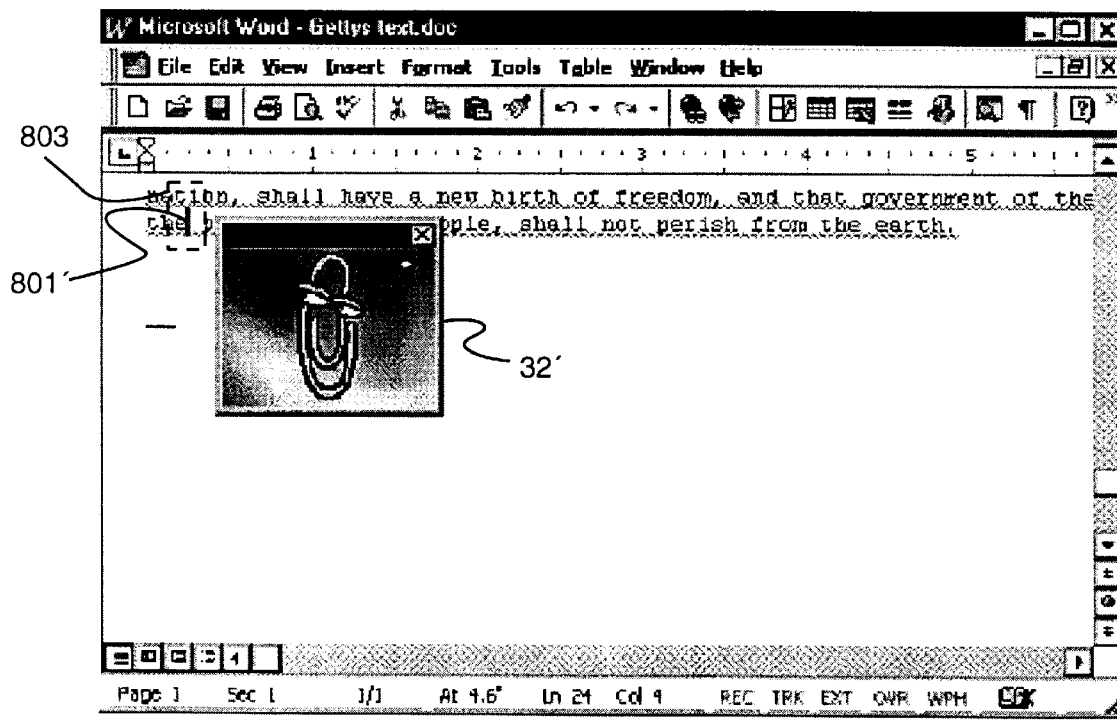

FIG. 8, consisting of FIGS. 8A and 8B, illustrates operation of the MoveAway function in response to the triggering condition of movement of the insertion point (IP) within a string of text. In FIG. 8A, the insertion point 801 is shown positioned on the left-hand side of the primary window 30, displaced a predetermined distance from the target window 32. In FIG. 8B, the insertion point has moved to the position shown at 801', with its associated bounding rectangle 803. The movement by the user of the insertion point to position 801' triggers the relocation of the target window to the position indicated at 32', displaced away from and beneath the original position at 32 in FIG. 8A.

FIG. 9, consisting of FIGS. 9A and 9B, graphically illustrates operation of the Move Away function in response to a triggering condition comprising insertion of a string of text, "New text causes line wrap", at the insertion point 901. Note in FIG. 9A that the insertion point 901 is positioned at the beginning of a paragraph, beginning with the word "But". The target window 32 is initially positioned somewhat centrally within the primary window 30. New text when typed by the user appears at the insertion point 901. Since these words are to be inserted at the beginning of the paragraph, the function of "word wrap" within a typical word processing program causes all the text within the indicated paragraph to shift, causing line wrap.

FIG. 9B indicates relocation of the target window to that shown at 32'. The insertion point has moved to 901', with the added text appearing to the left. In accordance with the invention, if the target window obscures either a line wrapped "from" or a line "to", the target window is moved. The avoidance region comprises a rectangle 905 bounding the line wrapped "from" and the two subsequent lines, although more or fewer lines could be provided if desired.

Figure 10A:
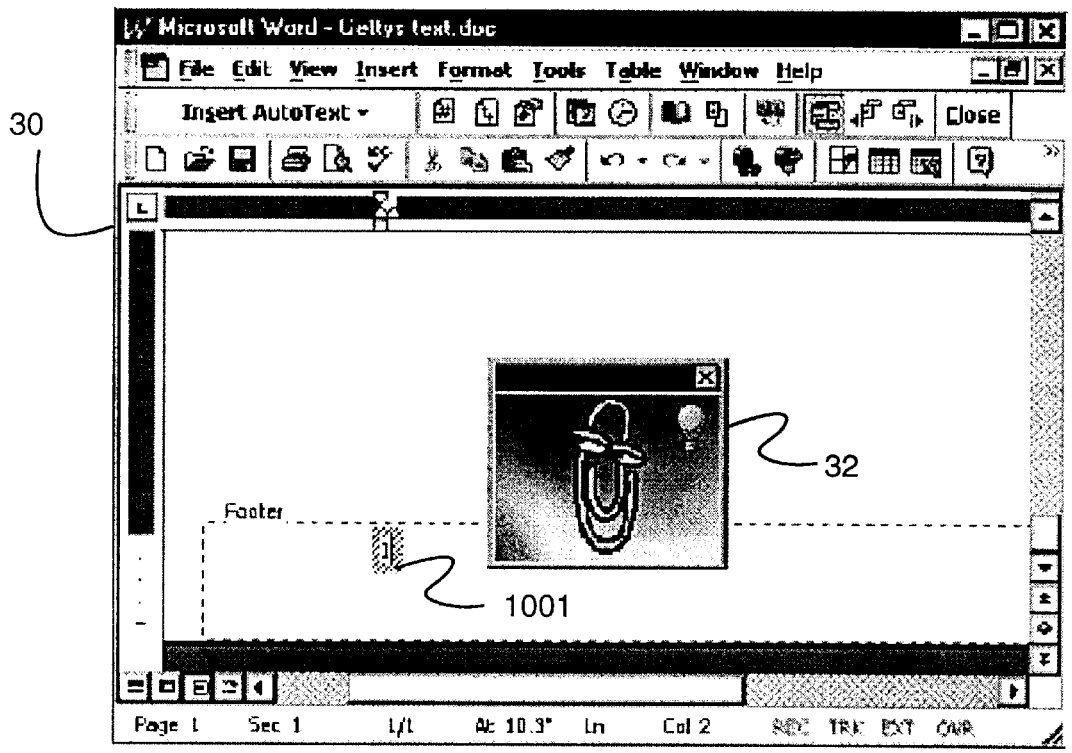
FIG. 10, consisting of FIGS. 10A and 10B, graphically illustrates operation of the MoveAway function in response to a trigger comprising insertion and/or display of a page number.
Figure 10B:
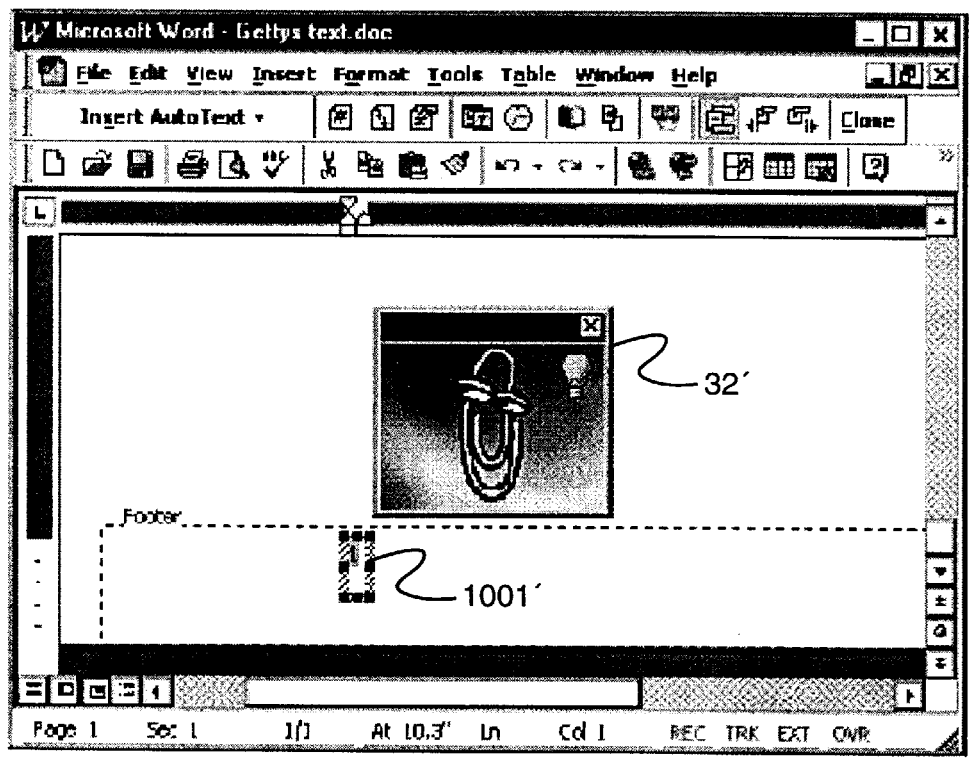

FIG. 10, consisting of FIGS. 10A and 10B, graphically illustrate operation of the Move Away function in response to a triggering condition comprising insertion and/or display of a page number. In accordance with the invention, if the target window obscures the location that a page number is inserted or displayed, the target window is moved. The avoidance region comprises a rectangle bounding the page number itself.

In FIG. 10A, the target window 32 is shown overlapping a footer region of a document displayed within the primary window 30, with a page number indicated at 1001. A dragging movement by the user of the page number 1001 to a location near the target window, such as that shown in FIG. 10B at 1001', causes movement of the target window to the position indicated at 32'.

Note in FIG. 3B that the repositioned target window 32' is to the right and upwardly displaced toward an anchor point associated with the upper right hand corner of the container window 30.

FIG. 11, consisting of FIGS. 11A and 11B, graphically illustrates operation of the Move Away function in response to a triggering condition comprising the viewing of a header or footer in a document. As shown in FIG. 11A, the target window 32 is assuming a position central to that of the primary window 30. In FIG. 11B, the user has invoked a command to View Header and Footer, indicated by the drop down menu 1101 and activation of the Header and Footer command 1102. This user command results in display of a header region such as that shown at 1105.

The triggering mechanism of display of the header 1105 causes movement of the target window 32 to that shown at 32', displaced downwardly and away from its initial position. The avoidance region comprises a rectangle bounding the header and/or footer, as appropriate.

FIG. 12, consisting of FIGS. 12A and 12B, graphically illustrates operation of the Move Away function in response to a triggering condition comprising a command to insert and/or view an annotation (i.e. a Comment) in a document.

FIG. 12A shows the insertion point initially positioned at 1201, with the target window 32 displayed beneath the insertion point.

In FIG. 12B, the user has invoked a command to view annotations by activating the View drop down menu 1205 and the Comments command at 1207. This user command causes display of a Comments pane shown at 1210 generally positioned at the bottom of the primary window 30. This trigger results in movement of the target window to the position 32' displaced above and to the right of its original position. The avoidance bounding rectangle is that of the Comments pane 1210.

FIG. 13, consisting of FIGS. 13A, 13B, and 13C graphically illustrates operation of the Move Away function in response to a triggering condition comprising a command to view or insert a footnote in a document. In FIG. 13A, the user has invoked a command to insert a footnote by activating the Insert menu drop down menu 1301 followed by selection of the Footnote . . . command at 1303. The target window 32 initially assumes a position somewhat central to the document displayed in the primary window 30.

In FIG. 13B, the activation of the Footnote command has caused display of a dialog box 1310 for input of user information associated with a footnote. The display of is the dialog box 1310 causes displacement of the target window to that indicated at 32', displaced beneath the dialog box 1310. (The user will enter the requested information in the dialog box 1310, and then activate the OK button or Cancel button.)

In FIG. 13C, the user has depressed the OK button, thereby causing display of a Footnotes pane as indicated at 1312. The target window is moved again to the position indicated at 32", displaced above the Footnotes pane 1312. The bounding rectangle defining the avoidance region comprises first the dimensions of the dialog box as shown in FIG. 13B, followed by the footnote pane 1312 as shown in FIG. 13C.

In like fashion, FIG. 14, consisting of FIGS. 14A and 14B, graphically illustrates operation of the Move Away function in response to a triggering condition comprising display of a dialog box. Those skilled in the art will understand that a dialog box is often displayed in response to actuation of certain commands, or in response to detection of certain conditions within the computer system.

In FIG. 14A, prior to appearance of the dialog box, the target window 32 assumes a position generally central to that of the text in the primary window 30. Assume that the user has invoked a keyboard shortcut command or other type of command that causes display of a dialog box such as that shown at 1401. In this example, a Format Paragraph command has been activated, causing display of the dialog box 1401 for entry of formatting information associated with a paragraph. Display of this dialog box causes the target window to assume the position shown at 32', displaced to the right of the dialog box 1401.

It will be noted in FIG. 14B that the target window 32' appears outside the boundary of the primary window 30. It should be understood that in the preferred embodiment, the target window is moved so that it no longer overlaps the avoidance region, and if the container is not "null", remains within the container region. It should also be understood that the container may be defined as any size, not necessarily limited to that of a primary window associated with a computer program. Similarly, the container may be defined as null, that is, having no value.

Preferably, the container region is defined to comprise the rectangle of a primary window associated with the associated application program, excluding any toolbars or status bars so that the target window does not interfere with controls or status indicators. For non-maximized windows, the container may be defined as null, giving more freedom in positioning the target window on the computer system's display. Such an example is shown in FIG. 14B.

FIG. 15, consisting of FIGS. 15A and 15B, graphically illustrates operation of the Obscure Function in response to a triggering condition comprising a drag operation. The example is that of dragging a selected chunk of text as shown at 1501 to appear in a new position indicated by the insertion bar 1503 in FIG. 15B. It will be noted that in FIG. 15B, because the user has dragged the cursor to a position proximate to the former position of the target window 32, indicated in outline at 32' in FIG. 15b, causing the target window 32 to temporarily disappear until completion of the dragging action. In the example shown, a dragging operation command box 1505 also appears, which in and of itself would cause either movement or disappearance of the target window.

Although the example of FIG. 15 is shown in the context of a drag operation in a word processor, those skilled in the art will appreciate that the drag operation is applicable to other types of application programs and operating system interfaces, for example, when a user drags over a group of cells in a spreadsheet, or drags over a group of icons on the desktop to select the icons for an operation, and the like.

FIG. 16, consisting of FIGS. 16A and 16B, graphically illustrates operation of the Obscure Function in response to a triggering condition comprising a resizing operation. In FIG. 16A, an example document is shown in a primary window 30, which also contains an embedded or inserted picture shown at 1601. The target window 32 is initially positioned somewhat to the right of the inserted picture 1601. As will be understood by those skilled in the art, selection of a graphical object such as that shown at 1601 causes display of "dragging handles", such as shown at 1605 in FIG. 16B. In response to the user "grabbing" one of the resizing handles, the graphical object 1601 can be "stretched" to assume a different size such as shown at 1601'. In this situation, the movement of a dragging handle 1605 into the region of the target window 32 causes momentary disappearance of the target window, as shown at in outline relief 32'. It will appreciated that the target window will reappear at its appropriate higher z-order upon release of the dragging handles.

FIG. 17, consisting of FIGS. 17A and 17B, graphically illustrates operation of the present invention to reduce the size of the target window in response to a triggering condition comprising elapse of time. In FIG. 17A, the target window 32 is displayed in a first or larger size in its container window 30. In the preferred embodiment, if the user fails to interact with the target window within a predetermined time period, for example five minutes, the system is automatically operative to reduce the size of the target window. This is shown at 32' in FIG. 17B. The minimized size 32' provides a less obtrusive display of the target window, while keeping the target window visible and in the topmost display order for convenience of the user.

Accordingly, an improved method and system for displaying a target window associated with a computer process from interfering with a user's interaction with a different computer process, has been described. In accordance with the principles of the invention, a target window which is desirable for display at a topmost z-order is moved, obscured, and/or reduced in response to predetermined triggering conditions. The target window maintains its topmost display position so that it is readily accessible by the user, while still moving "out of the way" in response to user interactions with a primary window associated with an application program in which the user is interacting.

The principles of the present invention are also readily applicable to virtually any type of computer application program such as the operating system user interface, databases, spreadsheets, web browsers, etc. Accordingly, other uses and modifications of the present invention will be apparent to persons of ordinary skill in the art without departing from the spirit and scope of the present invention. All of such uses and modifications are intended to fall within the scope of the appended claims.

What is claimed is:

1. In a computer system having a graphical user interface including a display and a user interface input device, a method for displaying a target window relative to a primary window, comprising the steps of:

displaying a primary window within a single region the display, the primary window comprising a predetermined region for displaying information and/or receiving user commands;

displaying a target window within a single region on the display, the target window comprising a predetermined region for displaying information and/or receiving user commands, the target window being displayed in a higher z-order than the primary window; and in response to a predetermined trigger condition, automatically performing a target window manipulation comprising moving the target window within the single region while maintaining the target window in a z-order higher than the primary window.

2. The method of claim 1, wherein the primary window comprises an active window of a computer application program, and wherein the target window displays a help character associated with a help function associated with the computer application program.

3. The method of claim 2, wherein the target window comprises an assistant associated with a suite of application programs.

4. The method of claim 1, wherein the target window manipulation comprises the operation of moving the target window on the display away from an area in the primary window that received a triggering stimulus provided by the user interface input device.

5. The method of claim 1, wherein the target window manipulation comprises the operation of temporarily hiding the target window on the display.

6. The method of claim 1, wherein the predetermined trigger condition is selected from the group comprising:

(1) selection of items of information in the primary window with the user interface input device, wherein the target window obscures any part of the selected items of information;

(2) movement of an insertion point (IP) associated with a computer application program to a predetermined boundary region associated with the target window;

(3) display of text in an application program in the primary window such that the target window obscures a line wrapped "from" or a line wrapped "to";

(4) the target window obscures display of a page number in an application program in the primary window;

(5) the target window obscures display of a header window or a footer window in an application program in the primary window;

(6) the target window obscures display of an annotation pane in an application program in the primary window;

(7) the target window obscures display of a footnote pane in an application program in the primary window;

(8) the target window obscures display of a dialog box in the primary window;

(9) during a user drag operation with the user interface input device in the primary window, the cursor is moved to within a predetermined boundary region associated with the target window; or

(10) during a user resizing operation with the user interface input device in the primary window, the cursor is moved to within a predetermined boundary region associated with the target window.

7. The method of claim 1, wherein the step of performing the target window manipulation comprises the step of moving the target window automatically in accordance with a predetermined biasing function.

8. The method of claim 7, wherein the predetermined biasing function comprises moving the target window a minimal distance in a selected direction.

9. The method of claim 8, wherein the minimal distance is a distance sufficient such that the target window does not obscure a predetermined avoidance region of the primary window, and wherein the direction of movement of the target window is selected in the direction of the minimum distance movement required such that the target window does not overlap the avoidance region.

10. The method of claim 1, wherein the step of performing the target window manipulation comprises the step of moving the target window in accordance with a predetermined avoidance function comprising the steps:

defining a container area on the display, the container area comprising a predetermined area within which the target window is allowed to move;

defining a boundary region relative to the target window, the boundary region comprising an undisplayed region of a predetermined size extending outwardly from the displayed area of the target window;

in response to a user operation with the user interface input device relative to the display, defining an avoidance region in the container area, the avoidance region comprising a predetermined region defined by a user avoidance region defining operation within which the target region is not to be displayed;

in response to the predetermined trigger condition, moving the target window to an area in the container area such that neither the boundary region nor the target window obscures the avoidance region.

11. The method of claim 10, wherein the user avoidance region defining operation comprises a dragging operation and wherein the avoidance region is rectangular.

12. The method of claim 10, further comprising the step of moving the target window a minimal distance in accordance with the predetermined avoidance function.

13. The method of claim 12, wherein the step of moving the target window a minimal distance comprises moving the target window in a predetermined direction such that the boundary region is outside the avoidance region by a predetermined distance.

14. In a computer system having a graphical user interface including a display and a user interface input device, a method of communicating between a first computer process and a second computer process, the first computer process causing display of a primary window on the display and being operative to receive user commands via the user interface input device, the second computer process operative for displaying a target window on the display and being operative to receive user commands via the user interface input device, comprising the steps of:

in the first computer process, defining a container region for display of the primary window, the container region comprising a predetermined area on the display within which the target window may be displayed;

in the first computer process, defining an avoidance region in the primary window, the avoidance region comprising a predetermined area on the display which the target window is to avoid in any movement operations; and in response to a predetermined trigger condition, passing parameters associated with the container region and with the avoidance region to a target window motion function associated with the second computer process.

15. The method of claim 14, wherein the primary window comprises an active window of a computer application program, and wherein the target window displays a help character associated with a help function associated with the computer application program.

16. The method of claim 15, wherein the target window comprises an animated assistant associated with a suite of application programs.

17. The method of claim 14, wherein the target window is maintained in a higher z-order than the primary window, and wherein the target window motion function is operative for moving the target window on the display away from an area in the primary window that received a triggering stimulus provided by the user interface input device, the triggering stimulus being associated with the predetermined trigger condition.

18. The method of claim 14, wherein the target window motion function is operative for temporarily hiding the target window on the display.

19. The method of claim 14, wherein the predetermined trigger condition is selected from the group comprising:

(1) selection of items of information in the primary window with the user interface input device, wherein the target window obscures any part of the selected items of information;

(2) movement of an insertion point (IP) associated with a computer application program to a predetermined boundary region associated with the target window;

(3) display of text in an application program in the primary window such that the target window obscures a line wrapped "from" or a line wrapped "to";

(4) the target window obscures display of a page number in an application program in the primary window;

(5) the target window obscures display of a header window or a footer window in an application program in the primary window;

(6) the target window obscures display of an annotation pane in an application program in the primary window;

(7) the target window obscures display of a footnote pane in an application program in the primary window;

(8) the target window obscures display of a dialog box in the primary window;

(9) during a user drag operation with the user interface input device in the primary window, the cursor is moved to within a predetermined boundary region associated with the target window; or (10) during a user resizing operation with the user interface input device in the primary window, the cursor is moved to within a predetermined boundary region associated with the target window.

20. The method of claim 14, wherein the target window is maintained in a higher z-order than the primary window, and wherein the target window motion function is operative for moving the target window in accordance with a predetermined biasing function.

21. The method of claim 20, wherein the predetermined biasing function comprises moving the target window a minimal distance in a predetermined direction.

22. The method of claim 21, wherein the minimal distance is a distance sufficient such that the target window does not obscure a predetermined avoidance region of the primary window, and wherein the direction of movement of the target window is selected in the direction of the minimum distance movement required such that the target window does not overlap the avoidance region.

23. The method of claim 20 wherein the predetermined biasing function compromises the steps:
    determining the movement distance required to move the target region up, down, left, and right on the display screen so that the target window does not overlap the avoidance region;
    applying a biasing factor to at least one movement distance associated with a selected direction of movement to obtain at least one biased movement distance;
    determining a set comprising the movement distances and at least one biased movement distance;
    selecting a minimum movement distance from the set of movement distances and the at least one biased movement distance; and
    redrawing the target window on the display at a location associated with the minimum movement distance.

24. The method of claim 23, wherein the minimum movement distance is a distance greater than a predetermined boundary distance from the avoidance region.

25. The method of claim 14, further comprising the steps of:
    defining a plurality of predetermined anchor points on the display, the each anchor point defining a different predetermined fixed location on the display;
    maintaining a move count of the number of times that the target window has been moved within a predetermined time period;
    in response to the trigger condition and to the move count exceeding a predetermined value, calculating the distance from a predetermined reference point associated with the target window to each anchor point;
    selecting which of the plurality of anchor points is closest to the reference point; and
    redrawing the target window on the display at a location associated with the selected anchor point.

26. The method of claim 25, further comprising the steps of:
    calculating the overlap of the target window relative to the avoidance region at a first proposed resting position associated with a first anchor point;
    calculating the overlap of the target window relative to the avoidance region at a second proposed resting position associated with a second anchor point; and
    selecting the first or the second proposed resting position as the position for redrawing the target window, whichever is associated with the minimum overlap.

27. The method of claim 14, wherein the target window avoidance region is defined in response to a user avoidance region defining operation with the user interface input device, and wherein the predetermined avoidance function comprises the steps:
    defining a boundary region relative to the target window, the boundary region comprising an undisplayed region of a predetermined size extending outwardly from the displayed region of the target window; and
    in response to the predetermined trigger condition, moving the target window to an area in the container area such that neither the boundary region nor the target window obscures the avoidance region.

28. The method of claim 27, wherein the user avoidance region defining operation comprises a dragging operation and wherein the avoidance region is rectangular.

29. The method of claim 14, wherein the step of moving the target window a minimal distance comprises moving the target window in a predetermined direction such that the boundary region is outside the avoidance region by a predetermined distance.

30. In a computer system having a graphical user interface including a display and a user interface input device, a method for displaying a target window relative to a primary window, comprising the steps of:
    displaying a primary window on the display, the primary window comprising a predetermined region for displaying information and/or receiving user commands;
    displaying a target window on the display, the target window comprising a predetermined region for displaying information and/or receiving user commands, the target window being displayed in a higher z-order relative to the primary window; and
    defining a container area on the display, the container area comprising a predetermined area within which the target window is allowed to move;
    defining a boundary region relative to the target window, the boundary region comprising an undisplayed region of a predetermined size extending outwardly from the displayed area of the target window;
    in response to a user operation with the user interface input device relative to the display, defining an avoidance region in the container area, the avoidance region comprising a predetermined region defined by a user avoidance region defining operation within which the target region is not to be displayed; and
    in response to a predetermined trigger condition, moving the target window to an area in the container area such that neither the boundary region nor the target window obscures the avoidance region.

31. The method of claim 30, wherein the user avoidance region defining operation comprises a dragging operation and wherein the avoidance region is rectangular.

32. The method of claim 30, further comprising the step of moving the target window in accordance with a predetermined biasing function.

33. The method of claim 32 wherein the predetermined biasing function comprises the steps:
    determining a minimal distance movement associated with movement of the target window in a predetermined direction such that the target window avoids the avoidance region; and
    redrawing the target window on the display at a location associated with the minimal distance movement.

34. The method of claim 32, wherein the predetermined biasing function comprises the steps:
    determining the movement distance required to move the target region up, down, left, and right on the display screen so that the target window does not overlap the avoidance region;

applying a biasing factor to at least one movement distance associated with a selected direction of movement to obtain at least one biased movement distance;

determining a set comprising the movement distances and at least one biased movement distance;

selecting a minimum movement distance from the set of movement distances and the at least one biased movement distance; and redrawing the target window on the display at a location associated with the minimum movement distance.

35. In a computer system having a graphical user interface including a display and a user interface input device, a method for displaying a target window relative to a primary window, comprising the steps of:

displaying a primary window on the display, the primary window comprising a predetermined region for displaying information and/or receiving user commands;

displaying a target window on the display, the target window comprising a predetermined region for displaying information and/or receiving user commands, the target window being displayed in a higher z-order relative to the primary window;

defining a container area on the display, the container area comprising a predetermined area within which the target window is allowed to move;

defining a plurality of predetermined anchor points on the display, the each anchor point defining a different predetermined fixed location on the display;

in response to a user operation with the user interface input device relative to the display, defining an avoidance region in the container area, the avoidance region comprising a predetermined region defined by a user avoidance region defining operation within which the target region should not be displayed;

determining whether the target window can be redrawn displaced a predetermined minimal distance away from the avoidance region;

in response to a determination that the target window can be redrawn displaced a predetermined minimal distance away from the avoidance region without overlapping the avoidance region, redrawing the target window at a location displaced a predetermined minimal distance away from the avoidance region in a selected direction of movement;

in response to a determination that the target window cannot be redrawn displaced a predetermined minimal distance away from the avoidance region without overlapping the avoidance region, determining the amount of overlap of the target window with the avoidance region at each of the plurality of anchor points;

selecting the particular anchor point that results in minimized overlap of the target window with the avoidance region; and redrawing the target window at a location associated with the particular anchor point that results in minimized overlap of the target window with the avoidance region.

36. The method of claim 35, wherein the predetermined trigger condition is selected from the group comprising:

(1) selection of items of information in the primary window with the user interface input device, wherein the target window obscures any part of the selected items of information;

(2) movement of an insertion point (IP) associated with a computer application program to a predetermined boundary region associated with the target window;

(3) display of text in an application program in the primary window such that the target window obscures a line wrapped "from" or a line wrapped "to";

(4) the target window obscures display of a page number in an application program in the primary window;

(5) the target window obscures display of a header window or a footer window in an application program in the primary window;

(6) the target window obscures display of an annotation pane in an application program in the primary window;

(7) the target window obscures display of a footnote pane in an application program in the primary window;

(8) the target window obscures display of a dialog box in the primary window;

(9) during a user drag operation with the user interface input device in the primary window, the cursor is moved to within a predetermined boundary region associated with the target window; or

(10) during a user resizing operation with the user interface input device in the primary window, the cursor is moved to within a predetermined boundary region associated with the target window.

* * * * *